US006922902B2

(12) United States Patent
Schierbeek et al.

(10) Patent No.: US 6,922,902 B2
(45) Date of Patent: Aug. 2, 2005

(54) VEHICLE COMPASS COMPENSATION

(75) Inventors: Kenneth L. Schierbeek, Zeeland, MI (US); Eric J. Hoekstra, Holland, MI (US); Rodney K. Blank, Zeeland, MI (US); Merdad Veiseh, Grand Haven, MI (US); Gregory H. DeVette, West Olive, MI (US); Kenneth Schofield, Holland, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 10/352,691

(22) Filed: Jan. 28, 2003

(65) Prior Publication Data

US 2003/0115764 A1 Jun. 26, 2003

Related U.S. Application Data

(62) Division of application No. 09/540,702, filed on Mar. 31, 2000, now Pat. No. 6,513,252.
(60) Provisional application No. 60/128,262, filed on Apr. 8, 1999.

(51) Int. Cl.$^7$ .............................................. G01C 17/38
(52) U.S. Cl. ............................ 33/356; 33/357; 324/244
(58) Field of Search .................. 33/355 R, 357, 33/333, 356; 702/92, 295, 115; 329/202, 225, 244, 260; 324/202, 225, 244, 260

(56) References Cited

U.S. PATENT DOCUMENTS

| 2,959,856 A | 11/1960 | Boose | 33/356 |
|---|---|---|---|
| 4,418,480 A | 12/1983 | Garner | 33/356 |
| 4,546,551 A | 10/1985 | Franks | 33/356 |
| 4,660,161 A | 4/1987 | Okada | 364/571 |
| 4,698,912 A | * 10/1987 | Fowler et al. | 33/356 |
| 4,720,992 A | 1/1988 | Hormel | 33/356 |

(Continued)

FOREIGN PATENT DOCUMENTS

| EP | 0321123 A1 | 6/1989 |
|---|---|---|
| GB | 2193321 A | 2/1988 |
| JP | 59100812 | 6/1984 |
| JP | 63187113 | 8/1988 |
| JP | 03068811 | 3/1991 |
| WO | 9512108 | 5/1995 |
| WO | 9848292 | 10/1998 |

OTHER PUBLICATIONS

European Search Report for European Application No. EP00650029 which is based on corresponding U.S. Appl. No. 09/540,702, filed on Mar. 31, 2000, entitled Vehicle Compass Compensation.

Primary Examiner—Diego Gutierrez
Assistant Examiner—Travis Reis
(74) Attorney, Agent, or Firm—Van Dyke, Gardner, Linn & Burkhart, LLP

(57) ABSTRACT

A compass compensation system is provided for automatically and continuously calibrating an electronic compass for a vehicle, without requiring an initial manual calibration or preset of the vehicle magnetic signature. The system initially adjusts a two axis sensor of the compass in response to a sampling of at least one initial data point. The system further calibrates the compass by sampling data points that are substantially opposite to one another on a plot of a magnetic field and averaging an ordinate of the data points to determine a respective zero value for the Earth magnetic field. The system also identifies a change in magnetic signature and adjusts the sensor assembly.

86 Claims, 10 Drawing Sheets

U.S. PATENT DOCUMENTS

| | | | |
|---|---|---|---|
| 4,725,957 A | * 2/1988 | Alberter et al. | 33/356 |
| 4,751,783 A | 6/1988 | Ina et al. | 33/361 |
| 4,763,268 A | 8/1988 | Itoh et al. | 364/449 |
| 4,771,547 A | * 9/1988 | Akutsu et al. | 33/356 |
| 4,797,841 A | * 1/1989 | Hatch | 33/355 R |
| 4,807,462 A | 2/1989 | Al-Attar | 73/1 E |
| 4,841,449 A | 6/1989 | Suyama | 364/449 |
| 4,852,012 A | 7/1989 | Suyama | 364/449 |
| 4,862,398 A | * 8/1989 | Shimizu et al. | 33/356 |
| 4,862,594 A | * 9/1989 | Schierbeek et al. | 33/356 |
| 4,866,627 A | 9/1989 | Suyama | 364/457 |
| 4,882,689 A | 11/1989 | Aoki | 364/449 |
| 4,953,305 A | 9/1990 | Van Lente et al. | 33/356 |
| 4,989,333 A | 2/1991 | Helldorfer et al. | 33/356 |
| 5,046,031 A | 9/1991 | Wanous | 364/571.02 |
| 5,117,375 A | * 5/1992 | Worcester et al. | 33/356 |
| 5,131,154 A | 7/1992 | Schierbeek et al. | 33/356 |
| 5,151,872 A | 9/1992 | Suzuki et al. | 33/356 |
| 5,161,311 A | * 11/1992 | Esmer et al. | 33/356 |
| 5,165,269 A | 11/1992 | Nguyen | 73/1 E |
| 5,187,872 A | 2/1993 | Dufour | 33/356 |
| 5,255,442 A | * 10/1993 | Schierbeek et al. | 33/356 |
| 5,287,295 A | * 2/1994 | Ives et al. | 33/355 R |
| 5,287,297 A | * 2/1994 | Ihara et al. | 33/356 |
| 5,297,063 A | 3/1994 | Cage | 364/571.02 |
| 5,297,065 A | 3/1994 | Cage et al. | 364/571.05 |
| 5,345,382 A | 9/1994 | Kao | 33/356 |
| 5,390,122 A | 2/1995 | Michaels et al. | 364/443 |
| 5,511,319 A | 4/1996 | Geerlings et al. | 33/356 |
| 5,581,899 A | 12/1996 | Brehler et al. | 33/356 |
| 5,632,092 A | 5/1997 | Blank et al. | 33/361 |
| 5,644,851 A | 7/1997 | Blank et al. | 33/361 |
| 5,699,044 A | 12/1997 | Van Lente et al. | 340/525 |
| 5,737,226 A | 4/1998 | Olson et al. | 364/457 |
| 5,761,094 A | 6/1998 | Olson et al. | 364/559 |
| 5,802,727 A | 9/1998 | Blank et al. | 33/361 |
| 5,878,370 A | 3/1999 | Olson | 701/224 |
| 6,513,252 B1 | 2/2003 | Schierbeek et al. | 33/356 |

* cited by examiner

VEHICLE COMPASS COMPENSATION

CROSS-REFERENCE TO RELATED APPLICATION

This application is a division of U.S. patent application Ser. No. 09/540,702, filed on Mar. 31, 2000, now U.S. Pat. 6,513,252, which claims priority from provisional patent application Ser. No. 60/128,262, filed on Apr. 8, 1999.

BACKGROUND OF THE INVENTION

This invention relates to a calibration system for a magnetic heading sensor, or compass, in a vehicle, and, more particularly to a continuous and fully automatic calibration system for the compass in the vehicle. The invention can be applied to a magneto-inductive sensor, magneto-resistive sensor, flux gate sensor and other known sensing technology.

Many vehicles today are equipped with magnetic compasses to determine the direction in which the vehicle is heading and convey such information to the passengers and/or driver of the particular vehicle. Generally, these magnetic compasses include a magneto-responsive sensor, such as a magnetic rotor sensor, a flux gate sensor, a magneto-resistive sensor, a magneto-inductive sensor, a magneto-capacitive sensor, or the like. The magneto-responsive sensor detects the magnetic field present in the vicinity of the vehicle and processes this signal in order to determine a directional heading of the vehicle relative to the Earth magnetic field. However, these magnetic compasses must be calibrated within the vehicle to account for any deviating magnetic field from the vehicle or other structures surrounding the vehicle, in order to determine the true heading of the vehicle relative to the Earth magnetic field. Additionally, as the deviating field may change over time, due to either a change in the magnetic signature of the vehicle or in the magnetic field surrounding the vehicle, an original calibration may later become less accurate.

To date, there have been compasses proposed which include automatic magnetic compass calibration within a vehicle after an initial manual adjustment or preset has been made to the compass system. Such calibration processes are performed as the vehicle is driven in order to account for changes in the deviating magnetic fields, thereby maintaining an accurate directional readout to the driver of the vehicle. However, many of these calibration systems require the vehicle to be oriented in specific directions relative to Earth magnetic field, such as orienting the vehicle in 180 degree opposite directions or driving the vehicle in a complete 360 degree circle while data is sampled by the system, in order to calibrate the system. Many other systems alternatively require complicated mathematical functions to determine the true Earth magnetic field based on several data points collected as the vehicle is driven in several directions. While these systems may provide an accurate calibration in many areas of the Earth, they are often based upon an assumption that a trace or plot of the Earth magnetic field is substantially circular in shape, as plotted on a Cartesian coordinate system relative to the vehicle. In reality, however, irregularities may occur in the mounting of the compass and/or sensors in the vehicle such that the sensors may be tilted relative to the magnetic field of the Earth. Furthermore, the variations or declinations present in the Earth magnetic field at any given location are generally not perfectly symmetrical, as the declination varies irregularly over the Earth surface and further varies over a period of time. These irregularities and variations may result in a substantially non-circular or oval-shaped trace of the magnetic field rather than the circular field that many of the proposed calibration systems are based on.

An additional concern with the systems proposed to date is that the initial deviating magnetic field or magnetic signature of the vehicle must be offset so that the magneto-responsive sensor's output will be within an operable range of the electronic processing system. As a vehicle is manufactured, or shortly thereafter, the deviating field of the vehicle may be substantially offset or nullified by an initial preset of the vehicle's magnetic signature, which brings an origin of the Earth magnetic field to within a predetermined range of a center or origin of the compass coordinate system. Once the vehicle has its magnetic signature preset, the algorithmic or digital calibration systems may be implemented to refine the vehicle compass to within a desired range of accuracy.

Furthermore, the magnetic signature of a vehicle may change significantly over time, such as when a new sunroof motor is installed in the vehicle, a magnetic antenna is mounted to the vehicle or the like. If the magnetic signature changes too much, the Earth magnetic field, as sensed by the sensors, may be shifted out of the operable range of the analog-to-digital converter of the calibration system. In order to re-set the deviating magnetic field of the vehicle such that the sensed Earth field is back within the window of the calibration systems, the compass system may again need to be manually adjusted by a mechanic or technician.

Therefore, there is a need in the art for a fully automatic and continuous calibration system for calibrating a magnetic compass located on a vehicle. The calibration system must be able to account for the deviating magnetic field of the vehicle without requiring an initial preset or demagnetization of the vehicle as the vehicle is assembled. Furthermore, the calibration system must continuously account for minor and major changes in the deviating magnetic field by digitally or physically adjusting for such changes. These adjustments must also account for both circular and non-circular Earth magnetic fields. Furthermore, the calibration system must account for major changes in the deviating magnetic field in order to avoid requiring manual adjustments throughout the life of the vehicle.

SUMMARY OF THE INVENTION

The present invention is intended to provide a fully automatic and continuous calibration system for vehicle compasses, which continuously calibrates the compass without requiring an initial preset of the vehicle magnetic signature or manual calibration of the compass.

According to an aspect of the present invention, a vehicular electronic compass system comprises a magneto-responsive sensor for sensing a magnetic field and an electronic circuit responsive to the sensor assembly for determining either the magnitude or direction, or both, of the Earth magnetic field. The sensor detects at least one data point and the electronic circuit adjusts the sensor according to an approximation of a center of the Earth magnetic field calculated from the at least one data point and an estimated value of Earth magnetic field magnitude. The system further includes a display coupled with the electronic circuit for displaying a direction of the Earth magnetic field.

According to another aspect of the invention, a vehicular electronic compass system includes a magneto-responsive sensor assembly for sensing a magnetic field and an electronic circuit responsive to the sensor assembly for determining either the magnitude or direction, or both, of the Earth magnetic field. The electronic circuit collects a plurality of data points relative to a coordinate system associated with the vehicle. Each of the data points has at least two components relative to the coordinate system. The electronic circuit averages at least one component of at least two of the data points to determine an estimated value of the Earth magnetic field along at least one axis of the coordinate system. In this manner, an estimated offset of the Earth magnetic field is calculated and the electronic circuit adjusts a directional heading output to account for the offset. An electronic display is coupled with the circuit for displaying a direction of the Earth magnetic field.

According to yet another aspect of the invention, a vehicular electronic compass system includes a magneto-responsive sensor assembly for sensing a magnetic field and an electronic circuit responsive to the sensor assembly for determining magnitude, direction, or both, of the Earth magnetic field. The electronic circuit collects data points, determines from the collected data points an offset value of the Earth magnetic field and adjusts a directional heading output of the sensor assembly to account for the offset value. The electronic circuit includes an extended range calibration function for identifying a change in magnetic signature from at least one of the sensor assembly and the offset value. The electronic circuit adjusts the sensor assembly in response to a change in magnetic signature. The system further includes an electronic display coupled with the electronic circuit for displaying a direction of the Earth magnetic field.

According to a more detailed aspect of the invention, a vehicular electronic compass system includes a magneto-responsive sensor assembly for sensing a magnetic field and a microcomputer system responsive to the sensor assembly for determining magnitude, direction, or both, of the Earth magnetic field. The microcomputer system collects data points, determines from the collected data points an offset value of the Earth magnetic field and adjusts a directional heading output of the sensor assembly to account for the offset. The microcomputer system occasionally calculates a new value of the offset. The microcomputer system has a digital-to-analog converter converting digital values to analog signals for adjusting the sensor assembly and an analog-to-digital converter having a range of operation for converting outputs of the sensor assembly to digital values. The microcomputer system adjusts the sensor assembly and calculates a new value of offset in response to either i) an output of the sensor assembly exceeding the range of operation of the analog-to-digital converter, ii) an abnormal relationship between collected data points and the value of the offset, or iii) a change in value of the offset which exceeds a predetermined amount. The system further includes an electronic display coupled with the microcomputer system for displaying a direction of the Earth magnetic field.

A calibration method for calibrating a compass for use on a vehicle according to an aspect of the invention includes sampling at least one data point of a magnetic field with a magnetic sensor, determining coordinates for the at least one data point relative to an origin of a coordinate system associated with the vehicle, estimating an origin of the Earth magnetic field from an estimated value of the Earth magnetic field magnitude and at least one data point and adjusting the sensor to offset the estimated origin to the coordinate system associated with the vehicle.

According to another aspect of the invention, a calibration method for calibrating a compass for use on a vehicle includes sampling at least one pair of data points that are substantially oppositely positioned relative to an axis of a coordinate system, averaging the substantially opposite values of the pair of data points to determine a deviation from a zero value of the coordinate system and adjusting an output of the system as a function of the deviation.

According to yet another aspect of the invention, a calibration method for calibrating a compass for use on a vehicle includes collecting data points with a sensor assembly, determining from the collected data points an offset value of the Earth magnetic field and adjusting a directional heading output of the sensor assembly to account for the offset. The method further includes identifying a change in magnetic signature from at least one of the sensor assembly and the offset value and adjusting the sensor assembly in response to a change in magnetic signature.

These and other objects, advantages, purposes and features of this invention will become apparent upon review of the following specification in conjunction with the drawings.

DESCRIPTION OF THE PREFERRED EMBODIMENT

Figure 1:
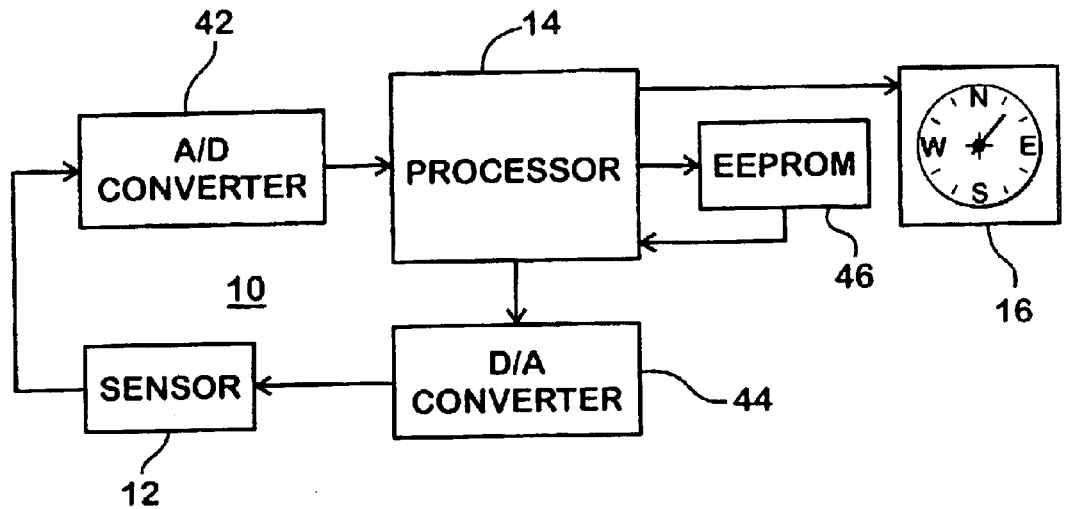
FIG. 1 is a block diagram of a vehicle compass system useful with the present invention.

Referring now to the drawings and the illustrative embodiments depicted therein, there is shown in FIG. 1 a block diagram of an electronic compass system 10 having a calibration system according to the present invention. Electronic compass system 10 may be installed on a vehicle, such as a car, truck, mini-van, light truck, sport utility vehicle, motorcycle, boat, airplane or the like, to provide the operator or passengers of the vehicle with information pertaining to a directional heading of the vehicle. Electronic compass system 10 includes a magneto-responsive sensor 12, such as a magneto-resistive sensor of the type disclosed in commonly assigned U.S. Pat. No. 5,255,442 issued to Schierbeek et al., the disclosure of which is hereby incorporated herein by reference, a magneto-inductive sensor of the type disclosed in commonly assigned U.S. Pat. No. 5,924,212 issued to Domanski, or in U.S. Pat. Nos. 5,239,264 and 4,851,775, the disclosures of which are hereby incorporated herein by reference, a flux gate sensor, a magneto-capacitive sensor, or the like, all of which are known in the art. Magneto-responsive sensor 12 is preferably at least a two axis sensor for sensing two components of a magnetic field. Compass system 10 further includes a microcomputer 14, which includes software having an algorithm for digitally or algorithmically calibrating the compass, and a display 16, which is provided to display the directional information to the operator of the vehicle. Display 16 may be part of a mirror assembly of the type disclosed in commonly assigned U.S. Pat. Nos. 6,005,538; 5,708,410; 5,610,756; 5,576,687; 5,530,240; and 5,285,060, the disclosures of which are hereby incorporated herein by reference. The mirror assembly may incorporate various accessories and functions, such as disclosed in commonly assigned U.S. Pat. Nos. 5,959,367 and 5,929,786 and patent application Ser. Nos. 09/449,121 filed Nov. 24, 1999, and 09/448,700 filed Nov. 24, 1999, the disclosures of which are hereby incorporated herein by reference.

Figure 2:
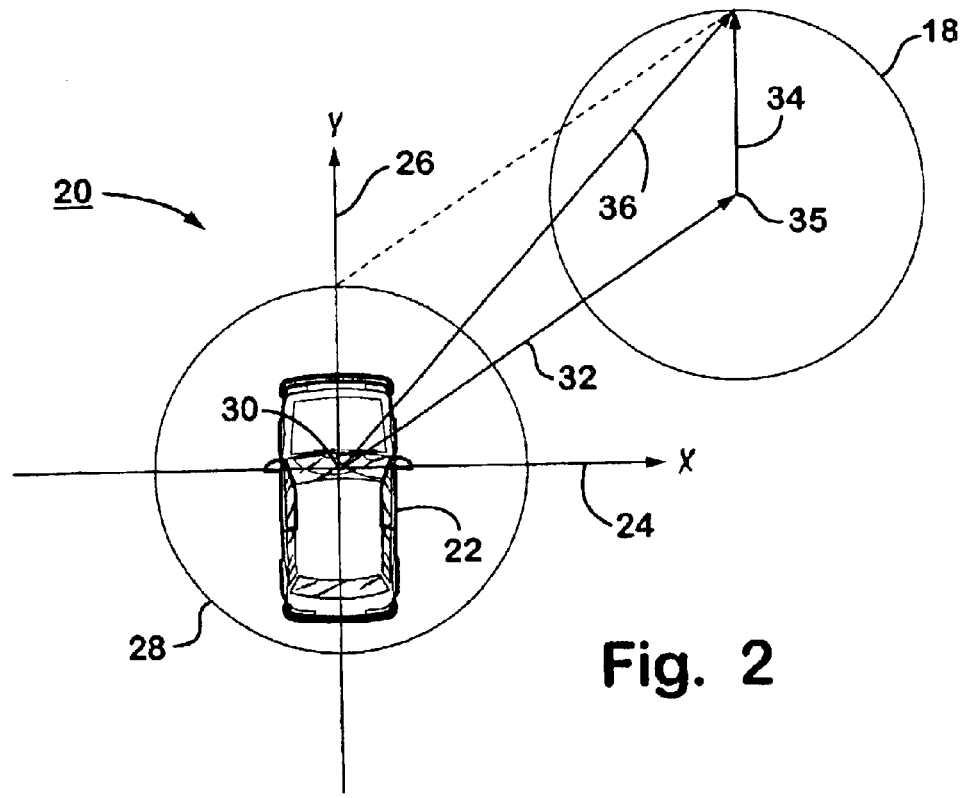
FIG. 2 is a diagram illustrating a Cartesian coordinate system associated with the vehicle and a magnetic field, as read by the sensor of the present invention, displaced from the coordinate system associated with the vehicle by a deviating magnetic field.

As shown in FIG. 2, an Earth magnetic field is generally represented as a substantially circular path 18 in a Cartesian coordinate system 20. The coordinate system 20 is shown associated with a vehicle 22, preferably such that one of the x and y axes 24 and 26, respectively, are oriented substantially in the direction that the vehicle 22 is heading. If vehicle 22 had no deviating magnetic field associated therewith, the magnetic field sensed by the magneto-responsive sensors 12 would be the true Earth magnetic field and would be represented by a substantially circular path 28 with a center point at an origin 30 of coordinate system 20. However, vehicles typically have a magnetic signature, or deviating magnetic field, associated with the vehicle and its surroundings, such that the Earth magnetic field 18 as sensed by the sensors 12 is offset from the origin 30 of the coordinate system 20, thereby resulting in an incorrect reading by the sensors 12. This is represented in FIG. 2 by a deviating field vector 32, which represents the deviating magnetic field associated with the vehicle, an Earth field vector 34, which represents the Earth magnetic field centered about an origin 35, and an error vector 36, which represents the magnetic field as sensed by the sensor. With no compensation system implemented, the vehicle illustrated in FIG. 2 would provide a directional signal to the operator of the vehicle corresponding to a Northeasterly direction, represented by error vector 36, while the true heading of the vehicle is in a substantially Northerly direction as shown by the Earth field vector 34. Therefore, in order to provide an accurate directional display, the deviating magnetic field (represented by vector 32) must be substantially nullified or offset such that the Earth magnetic field (represented by vector 34 and trace 18) provides the true directional signal to the vehicle's compass.

Electronic compass system 10 is preferably capable of magnetically biasing or adjusting the output of magneto-responsive sensors 12 in response to a signal from the microprocessor 14. Such biasing may be accomplished, for example, by generating an offset magnetic field, with the sensors being responsive to the offset magnetic field and the external magnetic field. The external magnetic field is a combination of the Earth magnetic field and a deviating field of the vehicle and its surroundings. An example of such a compass system is disclosed in the Schierbeek et al. '442 patent and commonly assigned U.S. Pat. Nos. 5,644,851, 5,632,092 and 5,802,727 issued to Blank et al., each of which is hereby incorporated herein by reference. Referring now to FIG. 1, sensors 12 of the compass system detect two components of a magnetic field that is the combination of the true Earth magnetic field and the deviating field of the vehicle. The analog output of sensors 12 is digitized and provided to microprocessor 14 via an Analog to Digital (A/D) converter 42. The microprocessor 14 receives the digital signal from A/D converter 42 and analyzes the signal to determine the true Earth magnetic field which is supplied to the readout for display 16. This determination depends on the amount of deviation present and on which calibration stage that calibration system is in, as discussed in detail below. If a magnetic adjustment, or biasing, of sensors 12 is required, a Digital to Analog (D/A) converter 44 receives a signal from microprocessor 14 and accordingly changes the offset of one or both of the axes of sensor 12 in a similar manner as disclosed in the Schierbeek et al. '442 patent. If an internal algorithmic compensation of data received by microprocessor 14 is required, microprocessor 14 compares data points with data stored in an electronic memory storage unit 46, or EEPROM, and determines the appropriate adjustment, if any, of a signal that is communicated to display 16.

Figure 5A:
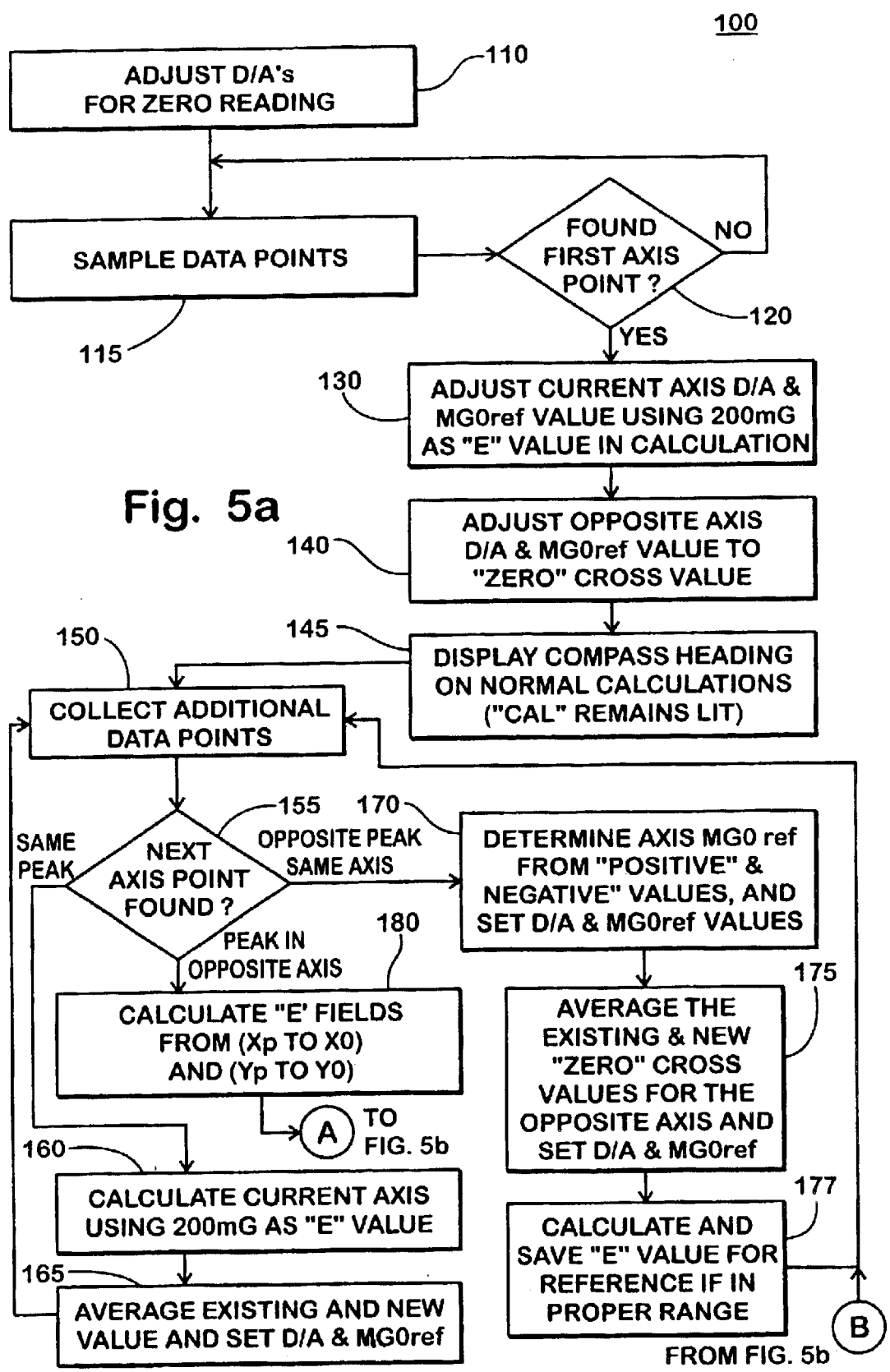
FIGS. 5a and 5b are a flow chart of a first calibration stage of a compass calibration technique according to the invention.
Figure 5B:
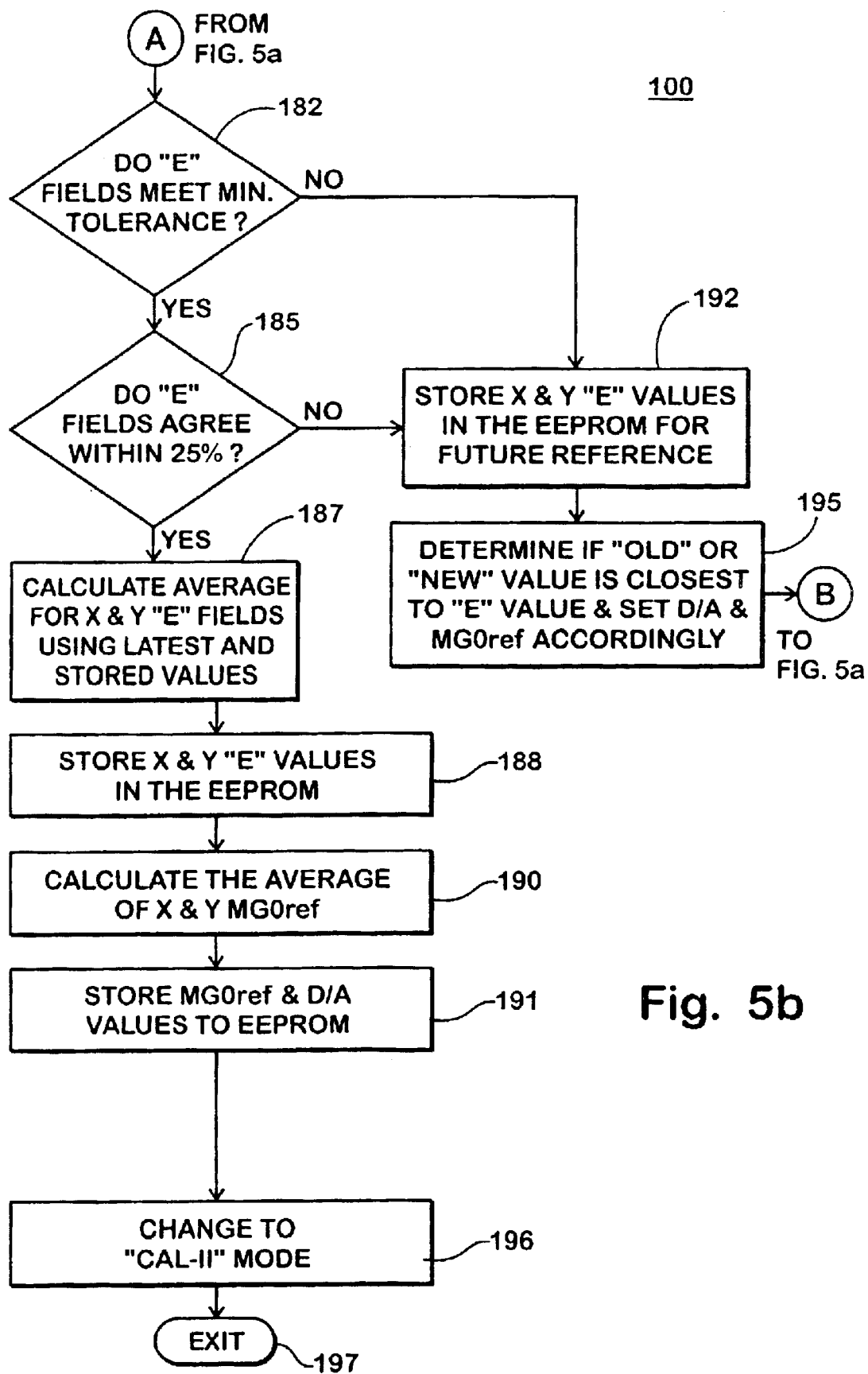
Figure 6:
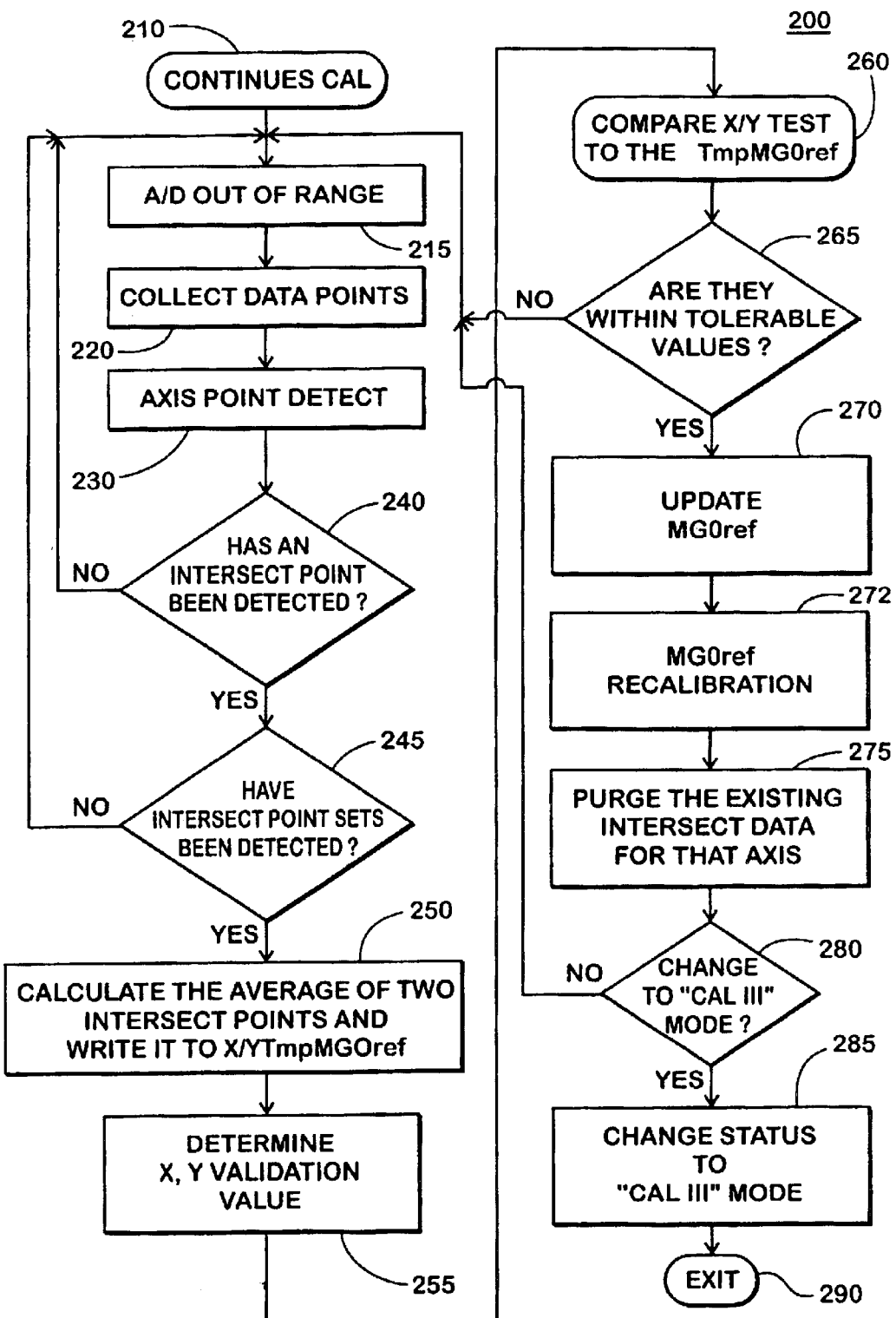
FIG. 6 is a flow chart of a second calibration stage of a compass calibration technique according to the invention.

Preferably, the calibration process of compass 10 of the present invention includes at least two calibration steps or procedures, which are referred to as CAL-I and CAL-II and depicted in the flow charts of FIGS. 5 and 6, respectively. However, additional calibration processes or stages may be implemented to further fine tune the system and readjust the sensors 12, as the vehicle magnetic signature may change over time. The first calibration step CAL-I of the present invention provides an initial offsetting or nullification of the vehicle magnetic signature or field.

The first calibration stage preferably provides electronic compass system 10 with a rapid and coarse adjustment of magneto-responsive sensors 12 in order to pull the sensors within a range of A/D converter 42, so that microprocessor 14 is capable of digitally processing and further calibrating the compass system, such as by an algorithm compensation, to accurately read the Earth magnetic field. Specifically, this initial step CAL-I collects a first data point, for example, a data point corresponding to one of the peaks of the Earth magnetic field namely, where the Earth field indicates a true north, south, east or west direction. An x and y component of this data point is sampled relative to the origin 30 of coordinate system 20 and the microprocessor 14 adjusts the sensor offset to bring the sensor output within an operable range of Analog-to-Digital converter 42. This is accomplished in a non-iterative process by using an assumed value of the Earth magnetic field magnitude, such as 200 mG, to calculate an approximate zero point of the Earth magnetic field with respect to the axis on which the peak corresponds to, once a single peak value of the field is detected by sensors 12. The opposite axis zero reference is then assumed to be at the corresponding value detected by Sensors 12. Sensors 12 are then offset by values substantially equal to the x and y components of the deviation vector from the origin 30 of the vehicle coordinate system 20 to the initial estimated center of the Earth magnetic field. Therefore, sensor 12 may be quickly biased to bring the origin of the Earth magnetic field within a predetermined range of the origin of the coordinate system of the compass system, without manually calibrating or presetting the vehicle in the assembly plant.

Referring now to the flow chart of FIGS. 5a and 5b, the processes of the CAL-I or first calibration stage 100 are shown. The process starts at 110 where the Digital to Analog converter 44 is zeroed and data are collected at 115. If it is determined at 120 that a first axis point or peak value is found, then the D/A signal for that axis and a first zero reference value, designated MG0ref, for that axis is calculated at 130. If it is determined at 120 that a first axis point is not found, then the system 10 continues to collect data at 115 until it is determined at 120 that a first axis point is found. After calculating the first zero reference value at 130, the D/A signal for the axis opposite to the one that was found and a second zero reference value relative to that axis are adjusted to a zero cross value at 140. The zero cross value is determined by assigning the detected value for that axis or ordinate to the zero reference. One or both axes of the sensors are then offset according to the D/A signals adjusted at 130 and 140, which provides a coarse non-iterative adjustment of sensors 12 to within a predetermined tolerance level of accuracy. A compass heading may then be displayed and the CAL light remains illuminated at 145.

As the vehicle is moved and turned in different directions, additional data points may be sampled at 150. It is then determined at 155 the nature of the next axis point that is found from the sampled data points. Microprocessor 14 determines at 155 that a point is along the same axis and the same or opposite polarity of the first point, or that it is along the other axis of the coordinate system. If it is determined at 155 that the next axis point is along the same axis and the same polarity, microprocessor 14 calculates a new zero reference relative to the new data point at 160, using an assumed value of the Earth magnetic field such as 200 mG. The microprocessor then averages the first and second zero values and sets the D/A signal and first zero reference accordingly at 165, in order to offset the magnetic sensor's zero value for that axis.

If it is determined at 155 that the second data point is along the same axis but of the opposite polarity (an opposite peak), the microprocessor calculates at 170 a zero value for that axis using the two data points and resets the corresponding zero reference and D/A signal for that axis accordingly. The first and second zero cross values are averaged and the D/A signal and zero reference for the second axis are set at 175. A new value of the Earth magnetic field value is then calculated and saved for later reference at 177. This new value will be used in later calculations since it is likely to be a more accurate representation of the Earth magnetic field than the assumed value, which varies along the surface of the Earth. If it is determined at 155 that the second axis point detected is on an opposite axis, for example, the first axis point is on the x axis and the second axis point is on the y axis, the microprocessor calculates at 180 a new zero reference value ($MGO_{ref}$) based on the two peak values obtained and the original estimate of the Earth magnetic field. If the new values are determined at 182, 185 to be within a certain predetermined tolerance level, the microprocessor calculates an average for the x and y fields using the latest and stored values at 187 and stores the values of $MGO_{ref}$ at 188. The average of the x and y zero reference points are then calculated at 190 and the magnetic sensor is offset according to the value of $MGO_{ref}$. The values are then stored at 191.

If it is determined at 182, 185 that the fields are not within the tolerance level, the values are stored at 192. The values are compared to the previous data at 195 to determine if the difference is small and thus attributable to noise or normal variations in the magnetic fields, or large and thus attributable to an anomaly for which the compass should not be immediately calibrated.

The CAL-I stage provides a physical adjustment of the magneto-responsive sensor 12, so that the outputs of the magneto-responsive sensors are within the operating range of A/D converter 42 wherein electronic compass system 10 is sensing magnetic fields within a predetermined tolerance band of the true center of the Earth magnetic field After data along both axes have been collected and processed, which will occur no later than after three different peaks have been detected, the compass system is offset in a manner which should establish a certain tolerance level of nullifying the vehicle's deviating magnetic field. The reading given by the compass display to the operator of the vehicle should be within an acceptable range of accuracy relative to the true Earth magnetic field. The system switches to CAL-II mode at 196 and exits CAL-I at 197.

Referring now to FIG. 6, a flow chart of a calibration process 200 performed by the microprocessor algorithm of the present invention is shown. The process 200, also referred to as CAL-II, starts at 210 by the system 10 initially performing an A/D out-of-range routine 215 in order to determine whether readings from the magneto-responsive sensor 12 are at the limit of the range A/D converter 42 and, if so, whether the anomaly causing the condition is permanent or temporary (FIG. 8) and to enter the CAL-I routine if the change is permanent. After the A/D out-of-range routine 215 is run, magneto-responsive sensor 12 senses and the microprocessor 14 collects and processes additional values of the sensed magnetic field at 220. After data points are collected at 220, an axis point detect routine 230 (FIG. 9) is conducted by micro-processor 14. Axis point detect routine 230 is run to determine if a significant change has occurred in the vehicle magnetic signature that may require entering CAL-I to make significant changes to the outputs of D/A converter 44. After axis point detect routine 230 is performed, it is then determined at 240 whether an intersect point is detected. If it is determined at 240 that an intersect point is detected, it is then determined at 245 whether a set, or pair, of intersect points has been detected. If not, then additional data points are collected at 220 until it is determined at 240 and 245 that intersect point sets have been detected.

If it is determined at 245 that a intercept point set has been detected, algorithm 200 calculates at 250 an average of the opposite values of the intersect points and stores this average as a temporary zero reference (Tmp $MGO_{ref}$) for the axis between the pair of intercept points (Tmp $MGO_{ref}$). An x/y validation value is determined at 255 using a known calibration technique. The value Tmp $MGO_{ref}$ may then be compared to a test or validation value at 260. It is determined at 265 whether these reference values are outside of an acceptable tolerance value. If so, the vehicle compass system continues to collect additional values at other intercept points around the path representing the Earth magnetic field (210–255). If it is determined at 265 that the values are within the tolerance level, the zero reference value for that axis is adjusted at 270. One technique for updating the magnetic zero reference would be to average the values obtained at 250 with the validation values obtained at 255. Alternatively, if it is determined at 265 that the values are within the tolerance level, the value of Tmp $MGO_{ref}$ may be adopted as $MGO_{ref}$.

Figure 10:
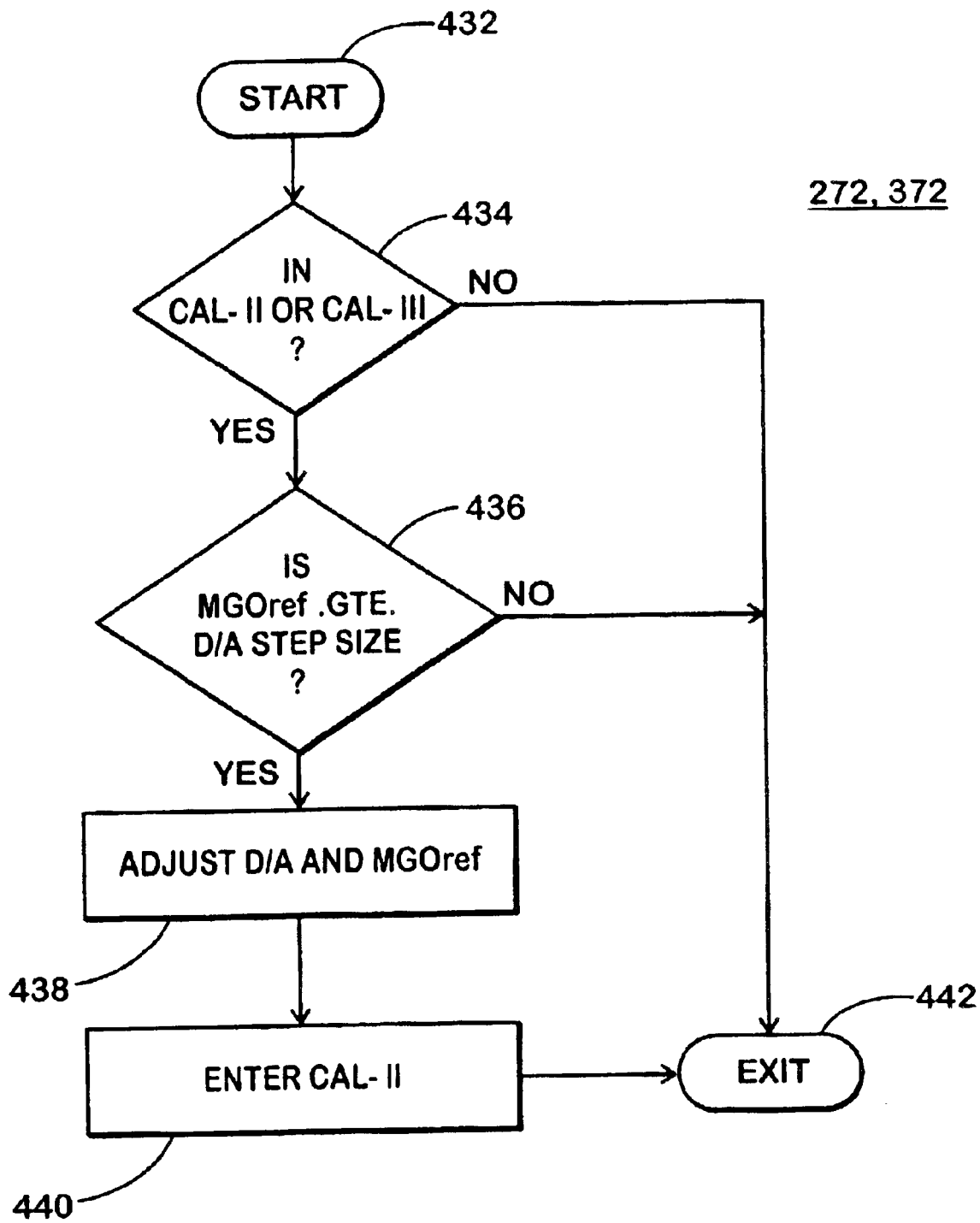
FIG. 10 is a flow chart of a magnetic zero reference calibration function.

A zero reference, $MGO_{ref}$, recalibration routine 272 is then peformed (FIGS. 10 and 13) after the value for $MGO_{ref}$ is updated (210–270). The purpose of the $MGO_{ref}$ recalibration routine is to make incremental adjustments to outputs of D/A converter 44 to compensate for significant changes made to the value of $MGO_{ref}$ to keep the corrected readings of sensors 12 well within the operating range of A/D converter 42. Preferably, the goal is to keep the corrected readings of sensors 12 generally centered in the operating range of A/D converter 42. After the zero reference recalibration routine 272 is performed, the intersect data is then purged at 275. The process then switches to a third calibration (CAL-III) mode at 285 and exits the process at 290, if it is determined at 280 that a value of MGO$_{ref}$ has been obtained and, therefore, the CAL-II mode is complete.

Most preferably, the third calibration stage 300 or CAL-III (FIG. 7) uses the same techniques as CAL-II, but requires multiple confirmations of detected changes, by collecting additional pairs of intercept data points, before concluding that a change in the calibration of the vehicle compass is actually necessary. Thereby, CAL-III is a damped version of the second calibration stage CAL-II since the vehicle compass calibration will only be adjusted if a predetermined number of data points are collected which convey an error in the present calibration. The CAL-III routine 300 includes steps 310–365 which correspond with steps 210–265 in the CAL-II routine 200. After it is determined at 365 that the reference values are within the tolerance values, it is then determined at 366 whether a number of N sets of values have been collected which all agree with each other within a particular tolerance. If so, then a new value of MGO$_{ref}$ is adopted which corresponds to the N sets of values. In the illustrated embodiment, the N sets may be collected without respect to ignition cycles. Alternatively, it may be required that the N sets be collected over a number of ignition cycles in order to ensure their validity prior to modifying the value of MGO$_{ref}$ at 370. After a new value of MGO$_{ref}$ is determined in CAL-III, the MGO$_{ref}$ recalibration routine is conducted at 372 and intersect data points are purged at 375. The CAL-III routine is then performed again beginning at 315.

By requiring additional data points before changing the calibration of the system, CAL-III prevents the system from recalibrating in response to noise in the data or, for example, each time the vehicle windshield wipers are activated or the vehicle passes through a bridge or tunnel or encounters any other structure which may temporarily alter either the vehicle's magnetic signature or the Earth magnetic field. Unless these anomalies are substantially continuous over a period of time, CAL-III does not adjust the system, thereby avoiding a temporary inaccurate reading of the actual directional heading of the vehicle. For example, CAL-III may not change the zero reference points for an axis until three or more consecutively sampled sets of intercept points, or sample sets taken over multiple ignition sequences of the vehicle, confirm that a calibration change is necessary. Only if the anomalies continue for a prolonged period of time or over a number of samples does calibration system 10 assume that they are not merely temporary anomalies and adjust the compass calibration accordingly. The techniques of the algorithm associated with CAL-III are applied automatically and continuously as the vehicle is being driven, thereby continuously adjusting the compass system only as is deemed necessary such that it maintains a proper directional reading to the operator of the vehicle During the second calibration stage, or state, CAL-II, and the third calibration stage, or state, CAL-III, compass system 10 preferably collects data points at a number of particular points referred to as intercept points around a substantially circular or elliptical trace 18 representing the Earth magnetic field for various orientations of the vehicle. In particular, eight intercept points, representing four pairs of points are located on trace 18 by choosing a first x value and determining a positive y coordinate and negative y coordinate for that x value. A midpoint, or null, is determined for that pair. This is repeated for a second x value on the opposite side of the y axis from the first x value. Two more intercept pairs are selected by choosing a value of y and determining an x coordinate and −x coordinate for that y value. A midpoint, or null, is then determined for that pair. This is repeated for a second value of y on the opposite side of the x axis from the first y value. From the four null values determined in this fashion, a true value of the deviating field vector 32 can be determined.

Figure 3:
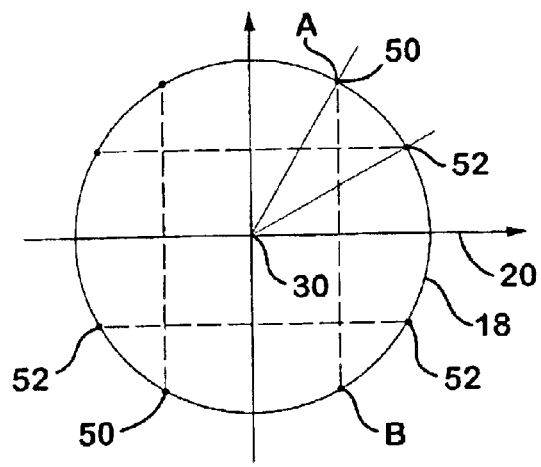
FIG. 3 is a diagram depicting intercept points along the sensed magnetic field at which an embodiment of the present invention collects data samples.
Figure 4:
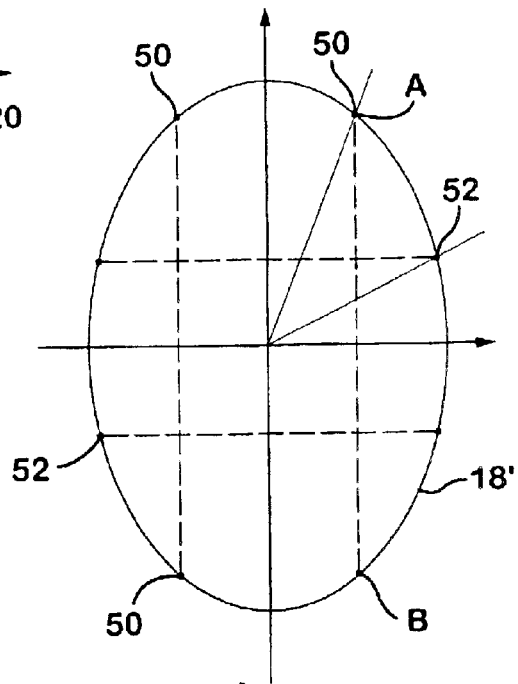
FIG. 4 is a diagram depicting the same intercept points as in FIG. 3, along an elliptical Earth magnetic field.
Figure 12:
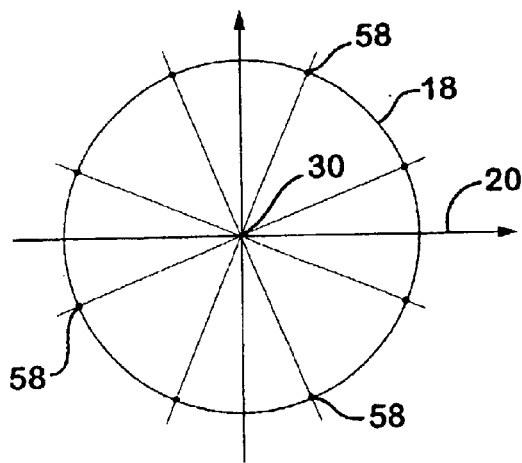
FIG. 12 is a diagram similar to that shown in FIG. 3, with the sampling points being at substantially the octant switch points of the compass system.

As shown in FIGS. 3 and 4, the x and y coordinates may be at points 50, where a vertical line, which passes through a point on the x axis representing a reduced value, such as half of the magnitude of the measured Earth magnetic field (E), intercepts the trace 18. These may also be x and y coordinates, such as at points 52, where a substantially horizontal line passing through the y axis at a point representing a reduced value, such as approximately half of the magnitude the Earth magnetic field value (E) likewise intercepts the trace 18. The vehicle compass system samples data at these points as the vehicle is driven and temporarily stores them in the memory unit 46. The vehicle need not be driven in a circle to collect these data points, as each point is collected when and if the vehicle is actually headed in that direction. Once a first intercept point is collected, the data at that point is stored until a second intercept point is encountered, such as a point opposite the respective axis of the first intercept point, whereby the pair of points share a common x or y component with respect to the coordinate system 20 associated with the vehicle. For example, if the first point is detected at point A (FIG. 3) having a coordinate ($x_1$, $y_1$), that point is stored until data is also collected at point B having a coordinate ($x_1$,−$y_1$), thereby completing a set or pair of intercept points. The microprocessor then uses the pairs of intercept values and calculates a predicted zero value by averaging one of the coordinates for that pair.

Preferably, another of the known techniques for compass compensation may be used for validating the value of the deviating field vector determined using the intercept point technique. If the zero value, or null, obtained using the intercept point technique, when compared with the results obtained by the other technique, is valid then no more data is collected. If not, then additional data points are collected. Preferably, the data collected from the intercept point technique is used for final calibration of the compass. Alternatively, the data collected from the intercept point technique may be averaged with the data collected to validate the data collected from the intercept point technique.

If the other data collected is not within a predetermined tolerance of where the intercept points predicted they should be, then additional intercept data may be obtained to determine if an anomaly has occurred either in the system or in the surrounding environment. The additional intercept data is then used to determine a new approximate center of or deviating vector to the Earth magnetic field.

The x and y components of the deviating vector are then mathematically "subtracted out" of the signal such that a more accurate representation of the vehicle heading relative to the Earth magnetic field is conveyed to display 16. Fine tuning this system with potentially only a few data points collected, CAL-II provides for a quick refinement of the vehicle compass to be within a specified tolerance range which is substantially tighter than the tolerance level applied to CAL-I. Preferably, CAL-II could be completed within a few test drives of the vehicle at a dealer's lot, such that the system is quickly accurate to within the specified tolerance level as required by the vehicle manufacturers.

Figure 7:
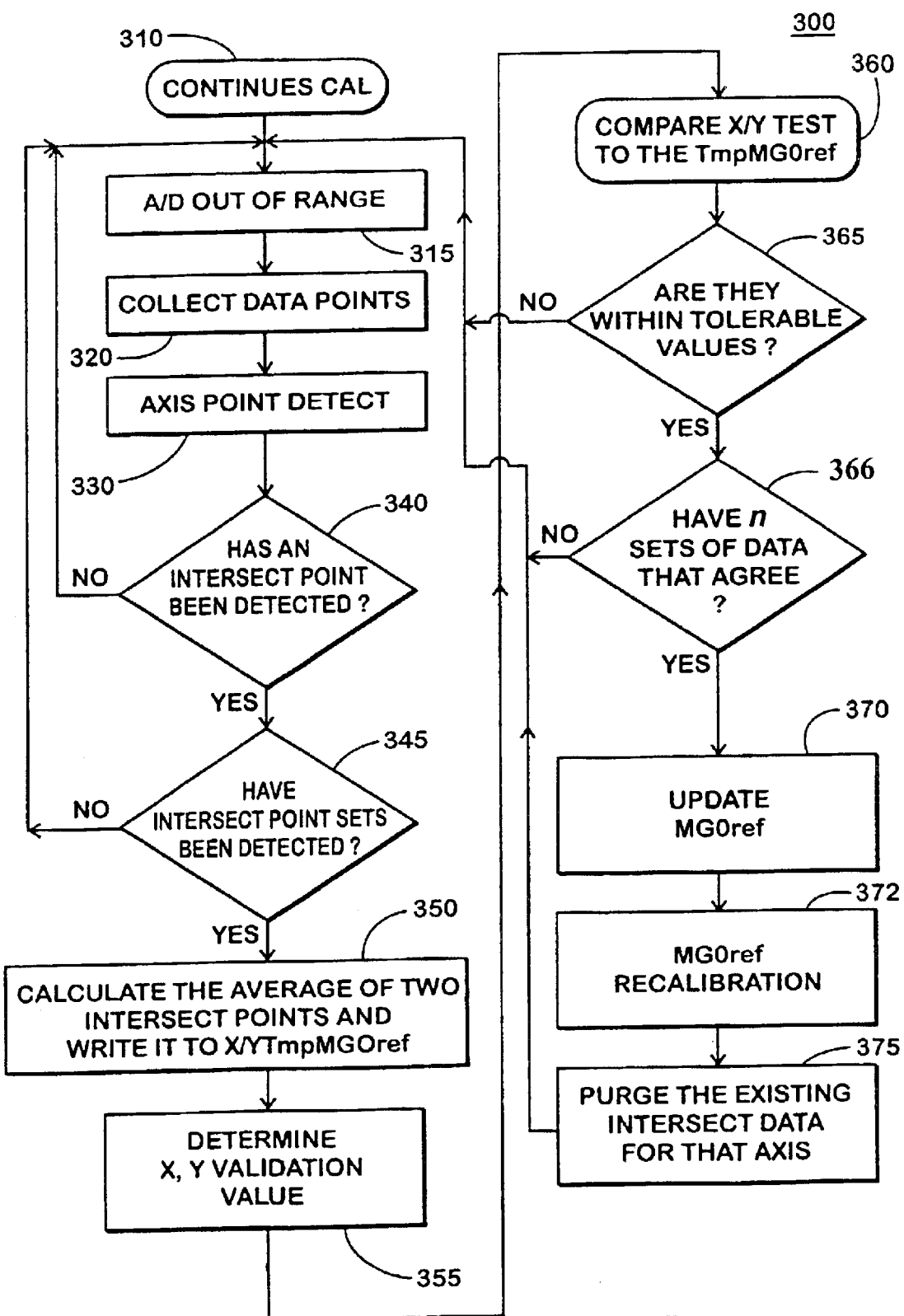
FIG. 7 is a flow chart of a third calibration stage of a compass calibration technique according to the invention.

Although the CAL-II and CAL-III calibration states are described as collecting intercept points at the mid-values of the Earth magnetic field, clearly other intercept points could be used without affecting the scope of the present invention. For example, as shown in FIG. 7, data may be sampled at each of the octant switch points 58, where the vehicle compass system changes its display from one direction to the next directional heading, such as from North to Northeast. Other data points may alternatively be used which are determined by using various angles to get the x and y coordinates and then averaging the opposite values, without affecting the scope of the present invention.

By collecting data at multiple specific points along the path representing the Earth magnetic field, averaging the values of a pair or set of points and using this data to calculate a center point of the path, the vehicle compass system is capable of collecting enough data without having to be turned through a 360 degree circle or be directed in substantially opposite directions, as is required in many of the prior art calibration systems. This also allows calibration process 200 to accurately calibrate compass system 10 while only requiring a limited number of data points to be stored at any time. Further, the mathematical algorithm implemented according to the present invention is relatively straightforward in that it merely averages sets of data points in order to calculate a center value of the circle, which avoids extensive mathematical calculations associated with arcs of a circle or the like. An additional benefit of the present invention is that not only is it easily applied to the generally circular path of the Earth magnetic field, but it applies equally as well to a substantially oval-shaped Earth magnetic field 18', as shown in FIG. 4. This allows the system to calibrate the vehicle compass and maintain its accuracy in situations or conditions where the Earth magnetic field is not substantially circular in shape when plotted on the Cartesian coordinate system 20 of the present vehicle compass.

The CAL-II and CAL-III modes therefore account for relatively minor changes of the vehicle magnetic signature. However, significant changes may occur that are beyond the capabilities of A/D converter 42 and microprocessor 14 of compass system 10. For example, the magnetic signature of a vehicle may change significantly if changes are made that may shift the deviating field of the vehicle. The shift may be due to a physical change to the vehicle, such as body work done on the vehicle, or a change to its surroundings. Also, the compass system may drift over time in a way that mathematical correction to the sensor headings may not be sufficient to keep the system calibrated. Accordingly, compass system 10 of the present invention preferably includes one or more extended calibration techniques. The extended range calibration techniques provide both fine and coarse adjustment to the sensing range of magneto-responsive sensor assembly 12 to keep the outputs of the sensor assembly within the operating range of A/D converter 42 throughout the operating life of the system 10. This may be accomplished in the illustrated embodiment by making fine or coarse adjustments to D/A converter 44 to adjust the operating range of sensor assembly 12. In the illustrated embodiment, extended range calibration techniques include one or more of A/D out-of-range routine 215, axis point detect range 230 and magnetic zero reference recalibration routine 272.

Figure 8:
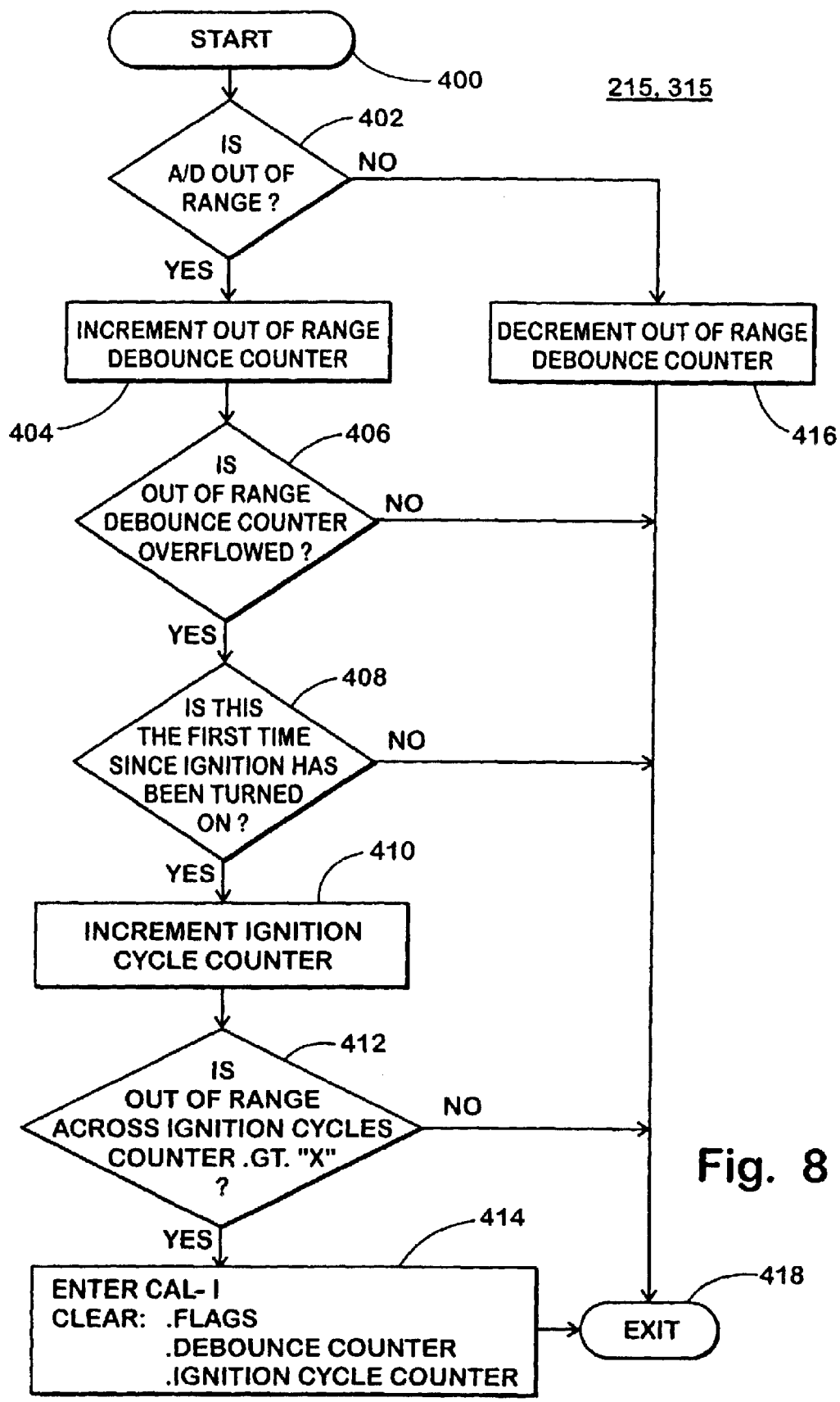
FIG. 8 is a flow chart of an A/D out-of-range function.

The A/D out-of-range routine 215, 315 begins at 400 and determines at 402 whether the outputs of sensor assembly 12 fall outside of the range of A/D converter 42 (FIG. 8). This may be accomplished be determining that A/D converter 42 is at one end of its range when attempting to convert an output of sensor assembly 12. If so, then a magnetic anomaly has occurred. The magnetic anomaly may be temporary, such as the vehicle being within a tollbooth, or a magnetic item, such as a magnetically mounted flag, being temporarily placed on the vehicle close to sensor 12. Alternatively, the anomaly may be permanent, such as a sunroof being cut in the vehicle roof or a permanent magnet mount being placed on the vehicle close to sensor 12. In order to distinguish between the two, the A/D out-of-range routine 215, 315 increments an out-of-range counter at 404 and determines at 406 whether the out-of-range counter has been incremented to a particular value. This allows the routine to distinguish between very short magnetic anomaly, such as passing under a bridge through a tollbooth or the like, and long-term magnetic anomaly, such as adding a sunroof. If the counter exceeds the predetermined value at 406, it is then determined at 408 whether this is the first time the counter has been incremented since the ignition has been turned on. If so, then an ignition cycle counter is incremented at 410. The purpose of the ignition counter is in order to monitor anomaly which may extend beyond single ignition cycles. For example, a magnetically mounted flag for a funeral may span one or two ignition cycles, but likely not more than that. However, a magnetically mounted antenna would span multiple ignition cycles. It is then determined at 412 whether the ignition cycle counter is greater than or equal to a predetermined value x. If so, then microprocessor 14 causes the program to enter the CAL-I routine at 414. In the CAL-I routine, the output of D/A converter 44 is re-established in order to place the outputs of sensors 12 within the range of A/D convener 42. It will also then be necessary to subsequently enter the CAL-II routine in order to re-establish a value for $MGO_{ref}$. If it is determined at 402 that the output of sensor 12 is not outside of the A/D converter range, the out of range debounce counter is decremented at 416, the routine is exited at 418 and the data collection portions 220, 320 of the respective CAL-II or CAL-III routines performed.

Figure 13:
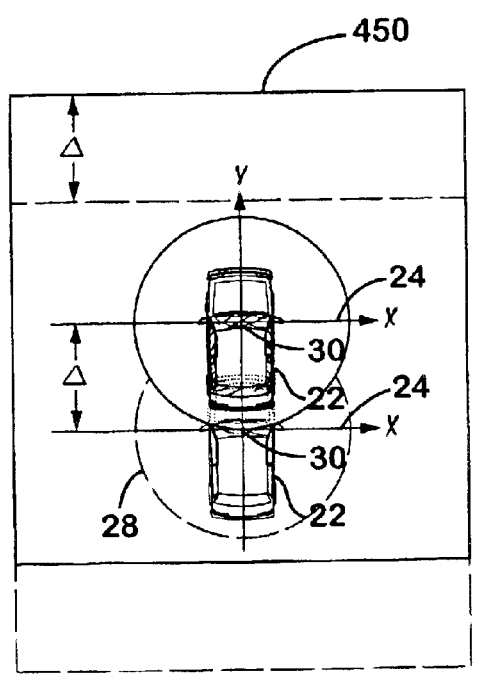
FIG. 13 is a diagram illustrating the magnetic zero reference recalibration function.
Figure 9:
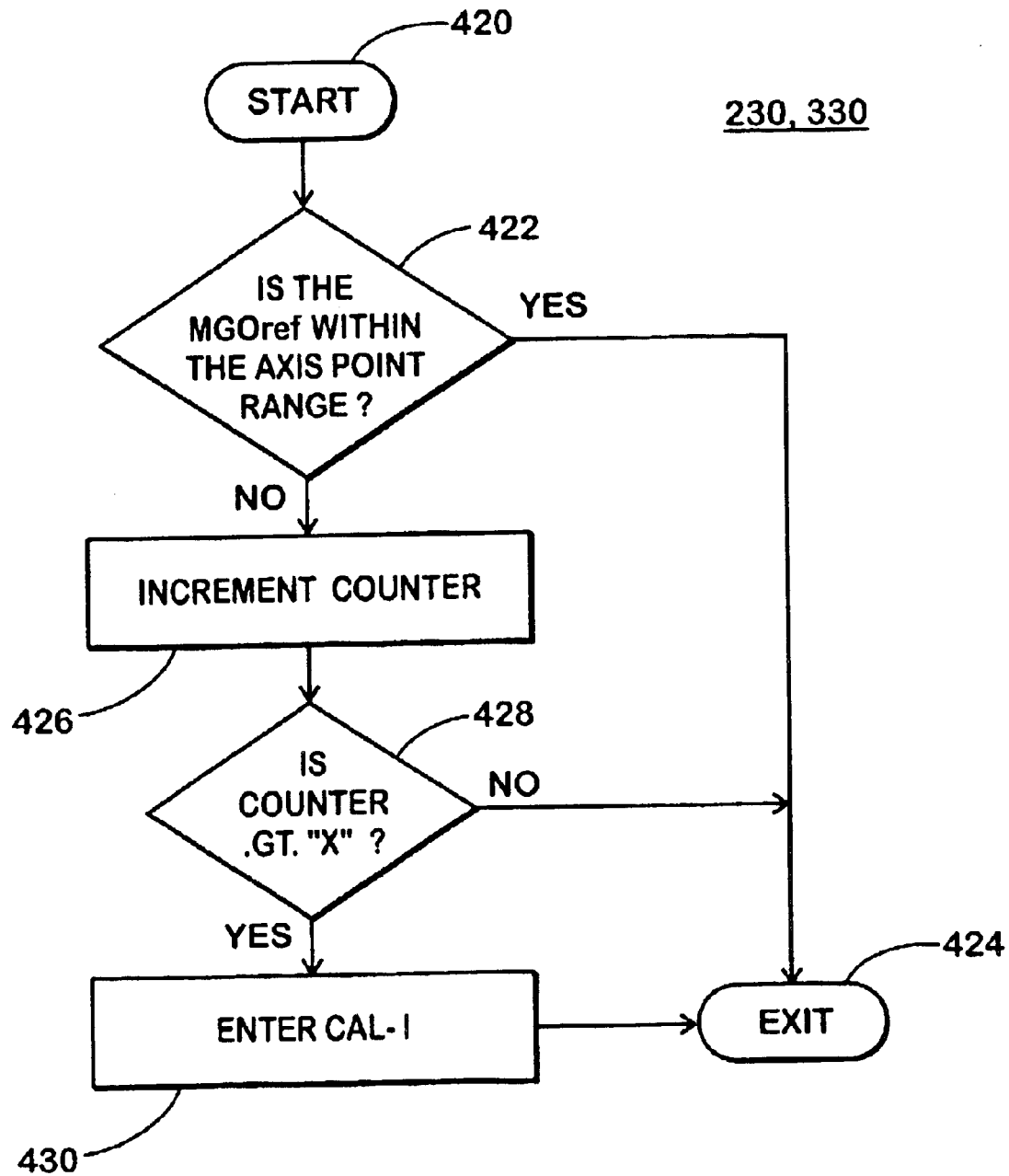
FIG. 9 is a flow chart of an axis point detect function.

The axis point detect routine 230, 330 is for the purpose of determining that large changes have occurred in the output of sensors 12 (FIG. 9). This is accomplished by examining the values of the data points collected at 220, 320 and determining whether the peak readings of the data points, for example, in the x axis or the y axis, show up on the incorrect side of the value of $MGO_{ref}$ than would be expected under normal operation. For example, if the peaks in the x axis data are expected to occur on opposite sides of the value $MGO_{ref}$ and, instead, both values of the x peak fall on one side or the other of the value of $MGO_{ref}$, then it is concluded that an abrupt change in the magnetic signature of the vehicle has occurred. The routine is started at 420. When such condition is detected at 422, a counter is incremented at 426. It is then determined at 428 whether the value of the counter is greater than or equal to a particular predetermined value. This is in order to avoid recalibration of the system 10 for temporary anomaly, such as by passing through a tollbooth or the like. If it is determined at 428 that the value of the incremental counter is greater than the predetermined number, microprocessor 14 enters the CAL-I routine at 430. This results in the outputs of D/A converter 44 being adjusted in order to bring the outputs of sensor 12 within the range of A/D converter 42. Alternatively, it may be possible to utilize an ignition cycle counter, such as that utilized in the A/D out-of-range routine 215, 315, in order to avoid responding to anomalies that span no more than a few ignition cycles of the vehicle. When the axis point detect routine is exited at 424, the respective CAL-II or CAL-III routine proceeds to 240, 340 to determine whether intersect points have been detected. The MGO$_{ref}$ recalibration routine 272, 372 is initiated at 432 and proceeds if the routine is in the CAL-II or CAL-III cycle, at 434. It is then determined at 436 whether the value of MGO$_{ref}$, as updated at 270, 370, has changed more than a particular step size Δ. In the illustrated embodiment, the step size Δ is set to 100 milligauss which is approximately 20 to 40 percent of the range 450 of A/D converter 42 (FIG. 13). When it is determined at 436 that the change to the value of MGO$_{ref}$ is greater than a step size designated Δ, the microprocessor 14 adjusts the output of D/A converter 44 at 438 by the value Δ in order to reposition the output of sensor 12 within the range 450 of A/D converter 42. FIG. 13 illustrates a step change in MGO$_{ref}$ along the y axis. The MGO$_{ref}$ recalibration routine would also apply to changes along the x direction. Preferably, microprocessor 14 adjusts the output of D/A converter 44 in a manner which tends to substantially center the output of sensor 12 within the range 450 of A/D converter 42.

When the output of D/A converter 44 is adjusted by the value of Δ, the value of MGO$_{ref}$ is no longer valid, the control program then enters the CAL-II routine at 440 in order to establish a new value of MGO$_{ref}$. The MGO$_{ref}$ routine is exited at 442 and control passes to 275,375 in the respective CAL-II or CAL-III routines.

Figure 11:
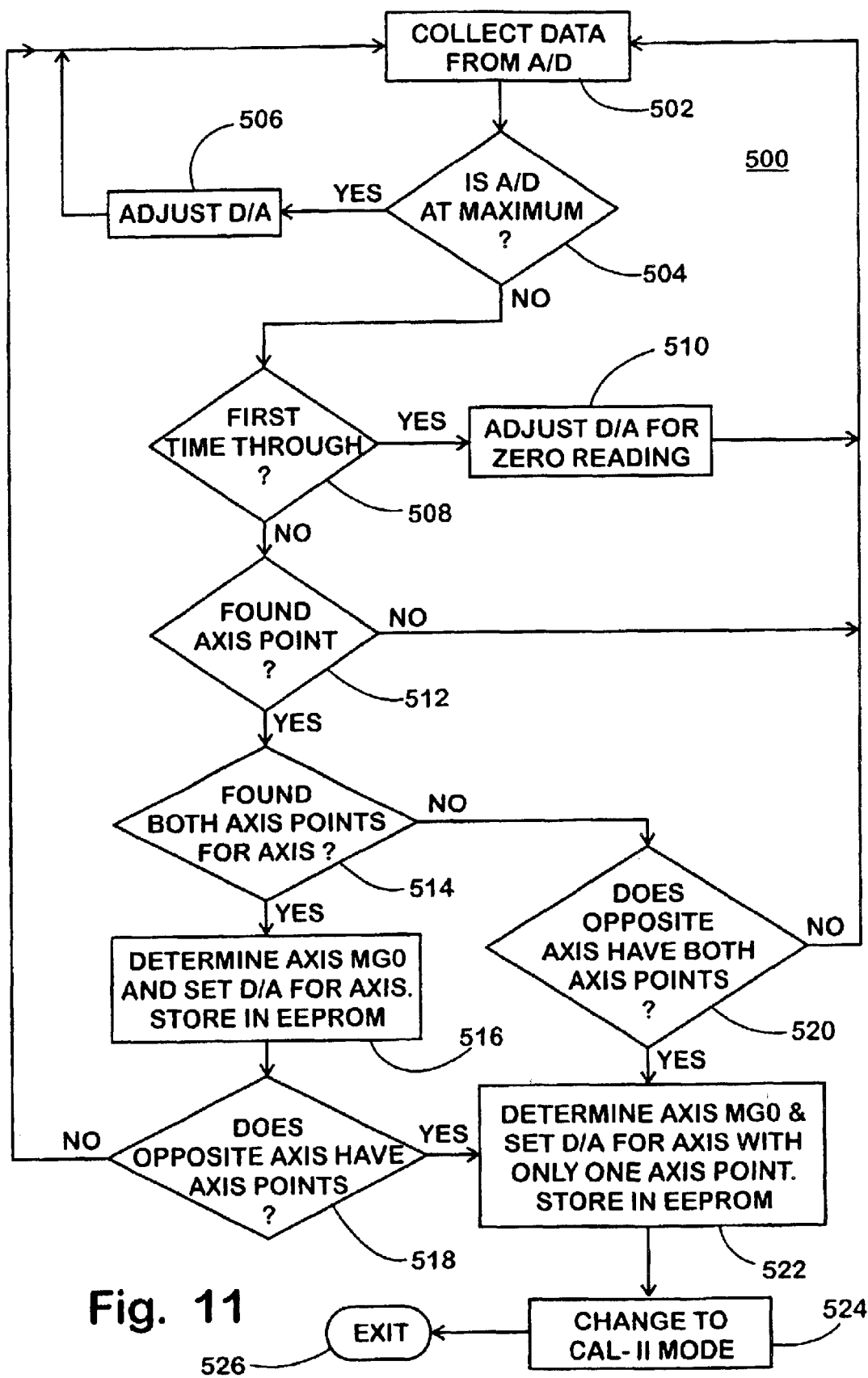
FIG. 11 is the same flow chart as FIGS. 5a and 5b of an alternative embodiment thereof.

An alternative form 500 of a CAL-I routine, which is based upon the location of opposite magnetic peaks on one axis and one peak on the other axis, is illustrated in FIG. 11. CAL-I routine 500 achieves a more accurate result than CAL-I routine 100, but takes somewhat longer to complete. Referring to FIG. 11, CAL-I routine 500 begins at 502 by collecting data points and determines at 504 whether the data points are outside the range of the A/D converter 42 in the same manner as previously described. If the data points are outside of the A/D range, microcomputer 14 adjusts D/A converter 44 at 506 to bring the outputs of the sensor assembly 12 within the range of the A/D converter in the same manner as in CAL-I routine 100. When the data points are within the range of the A/D converter, it is determined at 508 if this is the first time through the routine. If so, microcomputer 14 adjusts D/A converter 44 at 510 to produce a zero output from sensor assembly 12. If it is determined at 508 that this is not the first pass through the routine, it is determined at 512 and 514 if both points are found for one axis. If so, a value for MGO is determined at 516 in the same manner as for the CAL-I routine 100. It is then determined at 518 if an axis point is found on the opposite axis. If so, a value of MGO is determined at 522 for the axis having only one axis point. If it is determined at 514 that a second axis point is not found on that axis, then it is determined at 520 whether both axis points have been found on the other axis. If so, the value of MGO is established at 522 for the axis with only one axis point. The mode is changed to the CAL-II mode at 524 and the routine is exited at 526. Microcomputer 14 determines the value of MGO for both axes from only three axis points by determining the strength of the Earth magnetic field from the axis with both minimum and maximum axis values. This information is used in the value of the Earth magnetic field to determine the MGO value for that axis and to determine the MGO value for the axis having only one axis point. This improves accuracy over the prior technique which uses an estimated value for the Earth magnetic field.

Compass system 10 of the present invention may also be implemented on a motorcycle. Typically, compass systems are difficult to calibrate on a motorcycle due to the tilting of the vehicle from one side to another as it turns. Such tilting causes errors in the directional readings of the prior art compass systems, as they require a substantially horizontal or level orientation in order to accurately detect and process the Earth magnetic field. The present invention, on the other hand, substantially precludes such errors due to its multiple stages and continuous sampling of data as the vehicle or motorcycle is driven. Preferably, CAL-I and CAL-II could be performed quickly while the motorcycle is level or while traveling in a substantially figure eight path, so as to offset each tilt with a substantially equal and opposite tilt. In other words, a pair of sample points may require opposite tilts as well as being opposite a respective axis. CAL-III would then preferably function as described above, requiring additional data points in order to cause a change in the calibration of the compass system, so as to gather data that would include varying degrees and directions of tilt. Additionally, compass system 10 may be interconnected with a level measuring device, such that data points are sampled for any of the calibration stages only when the vehicle or motorcycle is within a predetermined range of a level or horizontal orientation based upon an output of the level measuring sensor or device.

Compass system 10 of the present invention may also be interconnected with a vehicle security system or device which detects movement of the vehicle when the compass system is not typically active, such as when the ignition has not been activated. The security system preferably senses or interrogates the compass system periodically while the ignition is off. If the compass heading changes while the ignition is not activated, then the security system determines that the vehicle is being tampered with such as being towed or otherwise hauled away. The security system may then activate an alarm or signal or may transmit a communication to a predetermined receiving device in response to this determination. This communication may be interconnected with a police tracking system and/or with a Global Positioning System in order to convey the new vehicle location to the recipient of the message.

This security system may alternatively be interconnected with other compass systems or with a level sensor, such as a leveling device for a vehicle suspension, such as of the type disclosed in commonly assigned provisional patent application Ser. Nos. 60/121,462, filed Feb. 24, 1999, and 09/511,587, filed on Feb. 23, 2000, by Eric Hoekstra, the disclosures of which are hereby incorporated herein by reference. These devices are used to detect when the vehicle is not in a level orientation, such as when the vehicle is towing a load. One such device includes a substantially vertical or horizontal lever interconnected with a potentiometer or other measuring device. The measuring device may include a magneto resistive sensor which senses an angular rotation of a magnetic element rotatably interconnected to a portion of the vehicle suspension. The security system may sense or monitor the leveling device when the ignition is in an off position. If the signal from the potentiometer or other measuring device changes while the vehicle is off, the security sensor then determines that the vehicle is being tampered with or otherwise being moved or towed away. As discussed above, the security system then may activate an alarm or communicate a signal or message in response to this determination. A display may also convey a degree of tilt of the vehicle to a driver or occupant of the vehicle or an adjustable suspension may be adjusted in response to a predetermined amount of tilt to counter the tilt and level the vehicle. For example, air may be supplied to or extracted from an air suspension unit to raise or lower a portion of the vehicle in order to level the vehicle.

Although described as monitoring a compass system or a leveling system, the security system discussed above may alternatively monitor or interrogate other devices or systems associated with the vehicle that are normally used or activated only when the vehicle is running. The security system monitors these devices when the vehicle is off to determine if the vehicle is being tampered with or moved. For example, the security system may monitor a wheel speed sensor, a transmission park sensor, a steering wheel or front wheel turning sensor or any other sensor or device that is not typically moved, activated or changed after a vehicle is parked and the ignition is turned off. Detection of motion or change in these types of devices when the ignition is off is generally a sign that the vehicle is being tampered with by someone other than the owner of the vehicle. Therefore, the security system would activate an alarm or signal in response to such a detection.

The compass system disclosed herein can also be useful with an outdoor temperature monitor. Such temperature monitors typically read a parameter of a temperature probe, mounted to sense exterior temperature, after a particular interval. The interval is selected to avoid preemption of other functions performed by the processor. Such interval is usually adequate when the vehicle is moving. However, when a vehicle sits in a garage or in the sun, the temperature sensed by the exterior temperature sensor may be in error when a vehicle begins movement. The compass system can be used to signal the processor that the vehicle has begun moving. The processor can then take one or more immediate samplings of the temperature sensor to update the reading during such transient situations. Other situations where the ability of a heading sensor such as a compass system to determine vehicle movement can provide useful information, both when the vehicle is running and not running, will be apparent to the skilled artisan.

Compass system 10 of the present invention provides for a cost effective means for continuously and automatically calibrating vehicle electronic compass systems. The present invention coarsely biases the magnetic sensors to be within a predetermined range of accuracy and then algorithmically fine tunes the system with straight forward processing that does not require extensive memory. Furthermore, all of the calibration procedures of the present invention may be applied to a compass system of a vehicle without requiring the vehicle to be driven in a complete 360 degree or otherwise oriented in specific predetermined directions during the calibration process. The calibration system is also capable of accurately calibrating the vehicle compass system in areas where the Earth magnetic field may not provide a substantially circular path in the coordinate system of the vehicle compass. The present invention also provides for extended range calibration in order to keep an electronic compass system in calibration over the life of the vehicle in which it is installed.

Therefore, an effective and low cost vehicle calibration system is provided which continuously and automatically calibrates and maintains calibration of the vehicle compass system without any attention required by the operator of the vehicle or other technicians. Furthermore, the calibration system of the present invention avoids the necessity to recalibrate the system every time an anomaly is encountered by requiring multiple data points which confirm that a change is actually necessary.

Changes and modifications in the specifically described embodiments can be carried out without departing from the principles of the invention, which is intended to be limited only by the scope of the appended claims, as interpreted according to the principles of patent law.

The embodiments of the invention in which an exclusive property right or privilege is claimed are defined as follows:

1. A vehicular electronic compass system comprising:
   a magneto-responsive sensor assembly for sensing a magnetic field, said magneto-responsive sensor comprising at least a two-axis sensor for sensing two components of a magnetic field, said two-axis sensor comprising a first axis sensing element and a second axis sensing element, one of said first axis sensing element and said second axis sensing element being generally aligned with a direction of travel of a vehicle when the vehicular electronic compass system is operated in the vehicle;
   an electronic circuit responsive to said two-axis sensor for distinguishing the Earth magnetic field from a deviating field of the vehicle in order to determine a directional heading of the vehicle;
   said electronic circuit including a microprocessor and an analog-to-digital converter;
   said distinguishing the Earth magnetic field from a deviating field of the vehicle incluiding an initial calibration mode that brings the output signal of at least one of said first axis and second axis sensing elements to be within the operable range of said analog-to-digital converter and wherein said electronic circuit detects a first peak value of the Earth magnetic field by said microprocessor of data sensed by one of said first axis and second axis sensing elements, wherein said electronic circuit detects a second peak value of the Earth magnetic field by processing by said microprocessor of data sensed by said one of said first axis and second axis sensing elements, wherein said electronic circuit calculates a zero reference value using said detected first and second peak values, wherein said electronic circuit detects a third peak value of the Earth magnetic field by processing by said microprocessor of data sensed by the other one of said first axis and second axis sensing elements, and wherein said electronic circuit algorithmically calculates a fourth peak value of the Earth magnetic field using said detected first, second and third peak values without a need for the vehicle to turn through a 360 degree circle; and
   an electronic display coupled with said electronic circuit, said electronic display displaying the directional heading of the vehicle at least during said initial calibration mode.

2. The vehicular electronic compass system in claim 1, wherein said magneto-responsive sensor comprises one of a magneto-inductive sensor, a magneto-resistive sensor, a magneto-capacitive sensor and a flux gate sensor.

3. The vehicular electronic compass system in claim 1, wherein said magneto-responsive sensor comprises a magneto-resistive sensor.

4. The vehicular electronic compass system of claim 1, wherein said first axis and second axis sensing elements are oriented in a predetermined angular relationship with each other and in a predetermined orientation with respect to the vehicle.

5. The vehicular electronic compass system of claim 1, wherein said magneto-responsive sensor senses Earth magnetic field and a deviating magnetic field and said electronic circuit adjusts said sensor to substantially nullify the deviating magnetic field.

6. The vehicular electronic compass system in claim 1, wherein said bringing of the output signals of at least one of said first axis and second axis sensing elements to be within the operable range of said analog-to-digital convertor utilizes an assumed value of the Earth magnetic field.

7. The vehicular electronic compass system in claim 6, wherein assumed value of the Earth magnetic field is about 200 mg.

8. The vehicular electronic compass system in claim 1, wherein said directional heading of the vehicle displayed by said electronic display is within a range of accuracy relative to the true Earth magnetic field acceptable to an operator of the vehicle.

9. The vehicular electronic compass system in claim 1, wherein said system switches to another calibration mode after said initial calibration mode is completed.

10. The vehicular electronic compass system in claim 9, wherein said another calibration mode accounts for relatively minor changes of the vehicle magnetic signature.

11. The vehicular electronic compass system in claim 10, wherein said another calibration mode encompasses at least two stages.

12. The vehicular electronic compass system in claim 11, wherein at least one of said at least two stages comprises data gathering over multiple ignition cycles of the vehicle.

13. The vehicular electronic compass system in claim 9, wherein said another calibration mode brings the directional heading of the vehicle displayed by said electronic display within a tighter range of accuracy relative to the true Earth magnetic field than what is achieved during said initial calibration mode.

14. The vehicular electronic compass system in claim 1, wherein said electronic display comprises part of a vehicular mirror assembly.

15. The vehicular electronic compass system of claim 1, wherein said electronic circuit includes an extended range calibration function, said extended range calibration function identifying a change in magnetic signature sensed by said magneto-responsive sensor and adjusting said magneto-responsive sensor in response to a change in magnetic signature.

16. The vehicular electronic compass system in claim 15, wherein said calibration function identifies a change in magnetic signature from said magneto-responsive sensor reaching a limit of operation of said electronic circuit.

17. The vehicular electronic compass system in claim 16, wherein said electronic circuit calculates a zero reference value or the Earth magnetic field after adjusting said sensor.

18. The vehicular electronic compass system in claim 15, wherein said calibration function identifies a change in magnetic signature from an abnormal relation between collected data points and said zero reference value of the Earth magnetic field.

19. The vehicular electronic compass system in claim 18, wherein said abnormal relation comprises said zero reference value of the Earth magnetic field fulling outside of opposite peak values of the Earth magnetic field.

20. The vehicular electronic compass system in claim 19, wherein said electronic circuit calculates a zero reference value of the Earth magnetic field after adjusting said sensor.

21. The vehicular electronic compass system in claim 15, wherein said electronic circuit occasionally calculates a zero reference value of the Earth magnetic field and wherein said calibration function identifies a change in magnetic signature from a change in said zero reference value of the Earth magnetic field which exceeds a predetermined amount.

22. The vehicular electronic compass system in claim 21, wherein said predetermined amount comprises a predetermined portion of an operating range of said electronic circuit.

23. The vehicular electronic compass system in claim 21, wherein said electronic circuit calculates a new zero reference value of the Earth magnetic field after adjusting said sensor.

24. The vehicular electronic compass system in claim 15, wherein said electronic circuit includes a digital-to-analog converter converting digital values to analog signals supplied to said magneto-responsive sensor for adjusting said magneto-responsive sensor.

25. The vehicular electronic compass system in claim 24, wherein said analog-to-digital converter converts outputs of said magneto-responsive sensor to digital signals, said analog-to-digital converter having a range of operation defining a limit of operation of said electronic circuit.

26. The vehicular electronic compass system in claim 15, wherein magneto-responsive sensor comprises one of a magneto-inductive sensor, a magneto-resistive sensor, a magneto-capacitive sensor, and a flux gaze sensor.

27. The vehicular electronic compass system in claim 15, wherein said magneto-responsive sensor comprises a magneto-resistive sensor.

28. The vehicular electronic compass system of claim 15, wherein said first axis and second axis sensing elements are oriented in a predetermined angular relationship with each other and in a predetermined orientation with respect to the vehicle.

29. A vehicular electronic compass system comprising:

a magneto-responsive sensor for sensing a magnetic field, said magneto-responsive sensor comprising at least a two-axis sensor for sensing two components of a magnetic field, said two-axis sensor comprising a first axis sensing element and a second axis sensing element, one of said first axis sensing element and said second axis sensing element being generally aligned with a direction of travel of a vehicle when the vehicular electronic compass system is operated in the vehicle;

an electronic circuit responsive to said two-axis sensor for distinguishing the Earth magnetic field from a deviating field of the vehicle in order to determine a directional heading of the vehicle;

said electronic circuit including a microprocessor;

said distinguishing the Earth magnetic field from a deviating field of the vehicle including an initial calibration mode that comprises said electronic circuit detecting a first peak value of the Earth magnetic field by processing by said microprocessor of data sensed by one of said first axis and second axis sensing elements, said electronic circuit detecting a second peak value of the Earth magnetic field by processing by said microprocessor of data sensed by said one of said first axis and second axis sensing elements, said electronic circuit calculating a zero reference value using said detected first and second peak values, said electronic circuit detecting a third peak value of the Earth magnetic field by processing by said microprocessor of data sensed by the other one of said first axis and second axis sensing elements, and said electronic circuit algorithmically calculating a fourth peak value of the Earth magnetic field using said detected first, second and third peak values without a need for the vehicle to turn through a 360 degree circle;

an electronic display coupled with said electronic circuit for displaying the directional heading of the vehicle; and wherein said directional heading of the vehicle displayed by said electronic display is within a range of accuracy relative to the true Earth magnetic field acceptable to an operator of the vehicle.

30. The vehicular electronic compass system in claim 29, wherein said electronic circuit includes an analog-to-digital converter and wherein said electronic circuit brings the output signals of at least one of said first axis and second axis sensing elements to be within the operable range of said analog-to-digital converter.

31. The vehicular electronic compass system in claim 30, wherein said bringing of the output signals of at least one of said first axis and second axis sensing elements to be within the operable range of said analog-to-digital converter utilizes an assumed value of the Earth magnetic field.

32. The vehicular electronic compass system in claim 31, wherein said assumed value of the Earth magnetic field is about 200 mg.

33. The vehicular electronic compass system of claim 30, wherein said electronic circuit includes an extended range calibration function, said extended range calibration function identifying a change in magnetic signature sensed by said magneto-responsive sensor and adjusting said magneto-responsive sensor in response to a change in magnetic signature.

34. The vehicular electronic compass system in claim 33, wherein said calibration function identifies a change in magnetic signature from said magneto-responsive sensor reaching a limit of operation of said electronic circuit.

35. The vehicular electronic compass system in claim 34, wherein said electronic circuit calculates a zero reference value of the Earth magnetic field after adjusting said sensor.

36. The vehicular electronic compass system in claim 33, wherein said calibration function identifies a change in magnetic signature from an abnormal relation between collected data points and said zero reference value of the Earth magnetic field.

37. The vehicular electronic compass system in claim 36, wherein said abnormal relation comprises said zero reference value of the Earth magnetic field falling outside of opposite peak values of the Earth magnetic field.

38. The vehicular electronic compass system in claim 37, wherein said electronic circuit calculates a zero reference value of the Earth magnetic field after adjusting and sensor.

39. The vehicular electronic compass system in claim 33, wherein said electronic circuit occasionally calculates a zero reference value of the Earth magnetic field and wherein said calibration function identifies a change in magnetic signature from a change in said zero reference value of the Earth magnetic field which exceeds a predetermined amount.

40. The vehicular electronic compass system in claim 39, wherein said predetermined amount comprises a predetermined portion of an operating range of said electronic circuit.

41. The vehicular electronic compass system in claim 40, wherein said electronic circuit calculates a new zero reference value of the Earth magnetic field after adjusting said sensor.

42. The vehicular electronic compass system in claim 33 wherein said electronic circuit includes a digital-to-analog converter converting digital values to analog signals supplied to said magneto-responsive sensor for adjusting said magneto-responsive sensor.

43. The vehicular electronic compass system in claim 42, wherein said analog-to-digital converter converts outputs of said magneto-responsive sensor to digital signals, said analog-to-digital converter having a range of operation defining a limit of operation of said electronic circuit.

44. The vehicular electronic compass system in claim 33, wherein said magneto-responsive sensor comprises one of a magneto-inductive sensor, a magneto-resistive sensor, a magneto-capacitive sensor, and a flux gate sensor.

45. The vehicular electronic compass system in claim 33, wherein said magneto-responsive sensor comprises a magneto-resistive sensor.

46. The vehicular electronic compass system of claim 33, wherein said first axis and second axis sensing elements are oriented in a predetermined angular relationship with each other and in a predetermined orientation with respect to the vehicle.

47. The vehicle electronic compass system in claim 29, wherein said system switches to another calibration mode after said initial calibration mode is completed.

48. The vehicular electronic compass system in claim 47, wherein said another calibration mode accounts for relatively minor changes of the vehicle magnetic signature.

49. The vehicular electronic compass system in claim 48, wherein said another calibration mode encompasses at least two stages.

50. The vehicular electronic compass system in claim 49, wherein at least one of said at least two stages comprises data gathering over multiple ignition cycles of the vehicle.

51. The vehicular electronic compass system in claim 47, wherein said another calibration mode brings the directional heading of the vehicle displayed by said electronic display within a tighter range of accuracy relative to the true Earth magnetic field than what is achieved during said initial calibration mode.

52. The vehicular electronic compass system in claim 29, wherein said magneto-responsive sensor comprises one of a magneto-inductive sensor, a magneto-resistive sensor, a magneto-capacitive sensor and a flux gate sensor.

53. The vehicular electronic compass system in claim 29, wherein said magneto-responsive sensor comprises a magneto-resistive sensor.

54. The vehicular electronic compass system of claim 29, wherein said first axis and second axis sensing elements are oriented in a predetermined angular relationship with each other and in a predetermined orientation with respect to the vehicle.

55. The vehicular electronic compass system of claim 29, wherein said magneto-responsive sensor senses the Earth magnetic field and a deviating magnetic field and said electronic circuit adjusts said magneto-responsive sensor to substantially nullify the deviating magnetic field.

56. The vehicular electronic compass system in claim 29, wherein said electronic display comprises part of a vehicular mirror assembly.

57. The vehicular electronic compass system in claim 29, wherein said electronic display displays said directional heading of the vehicle at least during said initial calibration mode.

58. A vehicular electronic compass system comprising:
   a magneto-responsive sensor for sensing a magnetic field, said magneto-responsive sensor comprising at least a two-axis sensor for sensing two components at a magnetic field, said two-axis sensor comprising a first axis sensing element and a second axis sensing element, one of said first axis sensing element and said second axis sensing element being generally aligned with a direction of travel of a vehicle when the vehicular electronic compass system is operated in the vehicle;
   an electronic circuit responsive to said two-axis sensor for distinguishing the Earth magnetic field from a deviating field of the vehicle in order to determine a directional heading of the vehicle;
   said electronic circuit including a microprocessor;

said distinguishing the Earth magnetic field from a deviating field of the vehicle including an initial calibration mode that comprises said electronic circuit detecting a first peak value of the Earth magnetic field by processing by said microprocessor of data sensed by one of said first axis and second axis sensing elements, said electronic circuit detecting a second peak value of the Earth magnetic field by processing by said microprocessor of data sensed by said one of said first axis and second axis sensing elements, said electronic circuit calculating a zero reference value using said detected first and second peak values;

said system switching to another calibration mode after said initial calibration mode is completed;

an electronic display coupled with said electronic circuit for displaying the directional heading of the vehicle;

said directional heading of the vehicle displayed by said electronic display being within a range of accuracy relative to the true Earth magnetic field acceptable to an operator of the vehicle; and wherein said electronic display displays said directional heading of the vehicle at least during said initial calibration mode.

59. The vehicular electronic compass system in claim 58, wherein said electronic circuit includes an analog-to-digital converter and wherein said electronic circuit brings the output signals of at least one of said first axis and second axis sensing elements to be within the operable range of said analog-to-digital converter.

60. The vehicular electronic compass system in claim 59, wherein said bringing of the output signals of at least one of said first axis and second axis sensing elements to be within the operable range of said analog-to-digital converter utilizes an assumed value of the Earth magnetic field.

61. The vehicular electronic compass system in claim 60, wherein said assumed value of the Earth magnetic field is about 200 mg.

62. The vehicular electronic compass system of claim 59, wherein said electronic circuit includes an extended range calibration function, said extended range calibration function identifying a change in magnetic signature sensed by said magneto-responsive sensor and adjusting said magneto-responsive sensor in response in a change in magnetic signature.

63. The vehicular electronic compass system in claim 62, wherein said calibration function identifies a change in magnetic signature from said magneto-responsive sensor reaching a limit of operation of said electronic circuit.

64. The vehicular electronic compass system in claim 63, wherein said electronic circuit calculates a zero reference value of the Earth magnetic field after adjusting said sensor.

65. The vehicular electronic compass system in claim 62, wherein said calibration function identifies a change in magnetic signature from an abnormal relation between collected data points and said zero reference value of the Earth magnetic field.

66. The vehicular electronic compass system in claim 65, wherein said abnormal relation comprises said zero reference value of the Earth magnetic field falling outside of opposite peak values of the Earth magnetic field.

67. The vehicular electronic compass system in claim 66, wherein said electronic circuit calculates a zero reference value of the Earth magnetic field after adjusting said sensor.

68. The vehicular electronic compass system in claim 62, wherein said electronic circuit occasionally calculates a zero reference value of the Earth magnetic field and wherein said calibration function identifies a change in magnetic signature from a change in said zero reference value of the Earth magnetic field which exceeds a predetermined amount.

69. The vehicular electronic compass system in claim 68, wherein said predetermined amount comprises a predetermined portion of an operating range of said electronic circuit.

70. The vehicular electronic compass system in claim 69, wherein said electronic circuit calculates a new zero reference value of the Earth magnetic field after adjusting said sensor.

71. The vehicular electronic compass system in claim 62, wherein said electronic circuit includes a digital-to-analog converter converting digital values to analog signals supplied to said magneto-responsive sensor for adjusting said magneto-responsive sensor.

72. The vehicular electronic compass system in claim 71, wherein said analog-to-digital converter converts outputs or said magneto-responsive sensor to digital signals, said analog-to-digital converter having a range of operation defining a limit of operation of said electronic circuit.

73. The vehicular electronic compass system in claim 62, wherein said magneto-responsive sensor comprises one of a magneto-inductive sensor, a magneto-resistive sensor, a magneto-capacitive sensor, and a flux gate sensor.

74. The vehicular electronic compass system in claim 62, wherein said magneto-responsive sensor comprises a magneto-resistive sensor.

75. The vehicular electronic compass system of claim 62, wherein said first axis and second axis sensing elements are oriented in a predetermined angular relationship with each other and in a predetermined orientation with respect to the vehicle.

76. The vehicular electronic compass system in claim 58, wherein said electronic circuit detects a third peak value of the Earth magnetic field by processing by said microprocessor of data sensed by the other one of said first axis and second axis sensing elements.

77. The vehicular electronic compass system of claim 76, wherein said electronic circuit algorithmically calculates a fourth peak value of the Earth magnetic field using said detected first, second and third peak values without a need for the vehicle to turn through a 360 degree circle.

78. The vehicular electronic compass system in claim 58, wherein said magneto-responsive sensor comprises one of a magneto-inductive sensor, a magneto-resistive sensor, a magneto-capacitive sensor and a flux gate sensor.

79. The vehicular electronic compass system in claim 58, wherein said magneto-responsive sensor comprises a magneto-resistive sensor.

80. The vehicular electronic compass system of claim 58, wherein said first axis and second axis sensing elements are oriented in a predetermined angular relationship with each other and in a predetermined orientation with respect to the vehicle.

81. The vehicular electronic compass system or claim 58, wherein said magneto-responsive sensor senses the Earth magnetic field and a deviating magnetic field and said electronic circuit adjusts said magneto-responsive sensor to substantially nullify the deviating magnetic field.

82. The vehicular electronic compass system in claim 58, wherein said another calibration mode accounts for relatively minor changes of the vehicle magnetic signature.

83. The vehicular electronic compass system in claim 82, wherein said another calibration mode encompasses at least two stages.

84. The vehicular electronic compass system claim 83, wherein at least one of said at least two stages comprises data gathering over multiple ignition cycles of the vehicle.

85. The vehicular electronic compass system in claim 58, wherein said another calibration mode brings the directional heading of the vehicle displayed by said electronic display within a tighter range of accuracy relative to the true Earth magnetic field than what is achieved during said initial calibration mode.

86. The vehicular electronic compass system in claim 58, wherein said electronic display comprises part of a vehicular mirror assembly.

* * * * *

UNITED STATES PATENT AND TRADEMARK OFFICE
CERTIFICATE OF CORRECTION

PATENT NO. : 6,922,902 B2
APPLICATION NO. : 10/352691
DATED : August 2, 2005
INVENTOR(S) : Kenneth L. Schierbeek et al.

It is certified that error appears in the above-identified patent and that said Letters Patent is hereby corrected as shown below:

In the Specification

Column 12:
Line 32, "convener" should be --converter--.

In the Claims

Column 16, lines 3-47:
Claim 1 should be deleted and replaced with --A vehicular electronic compass system comprising: a magneto-responsive sensor assembly for sensing a magnetic field, said magneto-responsive sensor comprising at least a two-axis sensor for sensing two components of a magnetic field, said two-axis sensor comprising a first axis sensing element and a second axis sensing element, one of said first axis sensing element and said second axis sensing element being generally aligned with a direction of travel of a vehicle when the vehicular electronic compass system is operated in the vehicle; an electronic circuit responsive to said two-axis sensor for distinguishing the Earth magnetic field from a deviating field of the vehicle in order to determine a directional heading of the vehicle; said electronic circuit including a microprocessor and an analog-to-digital converter; said distinguishing the Earth magnetic field from a deviating field of the vehicle including an initial calibration mode that brings the output signal of at least one of said first axis and second axis sensing elements to be within the operable range of said analog-to-digital converter and wherein said electronic circuit detects a first detected peak value of the Earth magnetic field by processing by said microprocessor of data sensed by one of said first axis and second axis sensing elements, wherein said electronic circuit detects a second detected peak value of the Earth magnetic field by processing by said microprocessor of data sensed by said one of said first axis and second axis sensing elements, wherein said electronic circuit calculates a zero reference value along an axis of said first and second detected peak values using said first and second detected peak values, wherein said electronic circuit detects a third detected peak value of the Earth magnetic field by processing by said microprocessor of data sensed by the other one of said first axis and second axis sensing elements, and wherein said electronic circuit algorithmically calculates another zero reference value along an axis of said third detected peak value by utilizing said Signed and Sealed this
Seventeenth Day of June, 2014

Michelle K. Lee
*Deputy Director of the United States Patent and Trademark Office* first, second and third detected peak values without necessity to detect a fourth detected peak value by calculating a fourth calculated peak value of the Earth magnetic field using said third detected peak value and said another zero reference value without a need for the vehicle to turn through a 360 degree circle; and an electronic display coupled with said electronic circuit, said electronic display displaying the directional heading of the vehicle at least during said initial calibration mode.--.

Column 17:
Line 1, Claim 6, "convertor" should be --converter--.
Line 45, Claim 17, "or" should be --of--.
Line 53, Claim 19, "fulling" should be --falling--.

Column 18:
Line 16, Claim 26, insert --said-- after "wherein".
Line 18, Claim 26, "gaze" should be --gate--.
Line 27 - Column 19, line 2:
Claim 29 should be deleted and replaced with --A vehicular electronic compass system comprising: a magneto-responsive sensor for sensing a magnetic field, said magneto-responsive sensor comprising at least a two-axis sensor for sensing two components of a magnetic field, said two-axis sensor comprising a first axis sensing element and a second axis sensing element, one of said first axis sensing element and said second axis sensing element being generally aligned with a direction of travel of a vehicle when the vehicular electronic compass system is operated in the vehicle; an electronic circuit responsive to said two-axis sensor for distinguishing the Earth magnetic field from a deviating field of the vehicle in order to determine a directional heading of the vehicle; said electronic circuit including a microprocessor; said distinguishing the Earth magnetic field from a deviating field of the vehicle including an initial calibration mode that comprises said electronic circuit detecting a first detected peak value of the Earth magnetic field by processing by said microprocessor of data sensed by one of said first axis and second axis sensing elements, said electronic circuit detecting a second detected peak value of the Earth magnetic field by processing by said microprocessor of data sensed by said one of said first axis and second axis sensing elements, said electronic circuit calculating a zero reference value along an axis of said first and second detected peak values using said first and second detected peak values, said electronic circuit detecting a third detected peak value of the Earth magnetic field by processing by said microprocessor of data sensed by the other one of said first axis and second axis sensing elements, and said electronic circuit algorithmically calculating another zero reference value along an axis of said third detected peak value by utilizing said first, second and third detected peak values without necessity to detect a fourth detected peak value by calculating a fourth calculated peak value of the Earth magnetic field using said third detected peak value and said another zero reference value without a need for the vehicle to turn through a 360 degree circle; an electronic display coupled with said electronic circuit for displaying the directional heading of the vehicle; and wherein said directional heading of the vehicle displayed by said electronic display is within a range of accuracy relative to the true Earth magnetic field acceptable to an operator of the vehicle.--.

Column 19:
Line 42, Claim 38, "and" should be --said--.
Line 56, Claim 42, insert --,-- after "33".

CERTIFICATE OF CORRECTION (continued)
U.S. Pat. No. 6,922,902 B2

Column 20:
Line 11, Claim 47, "vehicle" should be --vehicular--.
Line 53 - Column 21, Line 23:
Claim 58 should be deleted and replaced with --A vehicular electronic compass system comprising: a magneto-responsive sensor for sensing a magnetic field, said magneto-responsive sensor comprising at least a two-axis sensor for sensing two components of a magnetic field, said two-axis sensor comprising a first axis sensing element and a second axis sensing element, one of said first axis sensing element and said second axis sensing element being generally aligned with a direction of travel of a vehicle when the vehicular electronic compass system is operated in the vehicle; an electronic circuit responsive to said two-axis sensor for distinguishing the Earth magnetic field from a deviating field of the vehicle in order to determine a directional heading of the vehicle; said electronic circuit including a microprocessor; said distinguishing the Earth magnetic field from a deviating field of the vehicle including an initial calibration mode that comprises said electronic circuit detecting a first detected peak value of the Earth magnetic field by processing by said microprocessor of data sensed by one of said first axis and second axis sensing elements, said electronic circuit detecting a second detected peak value of the Earth magnetic field by processing by said microprocessor of data sensed by said one of said first axis and second axis sensing elements, said electronic circuit calculating a zero reference value along an axis of said first and second detected peak values using said detected first and second peak values; said electronic circuit detecting a third detected peak value of the Earth magnet field by processing by said microprocessor of data sensed by the other of said first axis and second axis sensing elements and said electronic circuit algorithmically calculating another zero reference value along an axis of said third detected peak value by utilizing said detected first, second and third detected peak values without necessity to detect a fourth detected peak value by calculating a fourth calculated peak value of the Earth magnetic field using said third detected peak value and said another calculated zero reference value without a need for the vehicle to turn through a 360 degree circle; said system switching to another calibration mode after said initial calibration mode is completed; an electronic display coupled with said electronic circuit for displaying the directional heading of the vehicle; said directional heading of the vehicle displayed by said electronic display being within a range of accuracy relative to the true Earth magnetic field acceptable to an operator of the vehicle; and wherein said electronic display displays said directional heading of the vehicle at least during said initial calibration mode.--.

Column 21:
Line 43, Claim 62, "in" should be --to-- in the second occurrence.

Column 22:
Line 17, Claim 72, "or" should be --of--.
Line 57, Claim 81, "or" should be --of--.

Column 23:
Line 1, Claim 84, insert --in-- before "claim".